United States Patent
Braun et al.

(10) Patent No.: US 7,073,620 B2
(45) Date of Patent: Jul. 11, 2006

(54) VEHICLE STEERING SYSTEM HAVING A REAR STEERING CONTROL MECHANISM

(75) Inventors: Eric E. Braun, Neenah, WI (US); Martin J. Schimke, Redgranite, WI (US); Brian K. Anderson, Oshkosh, WI (US); Jesse D. Gander, Larsen, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 27 days.

(21) Appl. No.: 10/456,376

(22) Filed: Jun. 6, 2003

(65) Prior Publication Data

US 2004/0245039 A1    Dec. 9, 2004

(51) Int. Cl.
  *B62D 5/06*    (2006.01)
(52) U.S. Cl. .................... 180/410; 280/91.1
(58) Field of Classification Search ............... 180/410, 180/411, 409, 234; 701/41, 42; 280/91.1, 280/99, 93.501
See application file for complete search history.

(56) References Cited

U.S. PATENT DOCUMENTS

| | | | |
|---|---|---|---|
| 3,414,286 A | 12/1968 | Muller et al. | |
| 3,654,820 A | 4/1972 | Shachter | |
| 4,003,444 A | 1/1977 | Nobutomo et al. | |
| 4,105,086 A | 8/1978 | Ishii et al. | |
| 4,406,472 A | 9/1983 | Furukawa | |
| 4,483,547 A | 11/1984 | Furukawa et al. | |
| 4,522,416 A | 6/1985 | Sano et al. | |
| 4,522,417 A | 6/1985 | Sano et al. | |
| 4,538,824 A | 9/1985 | Furukawa et al. | |
| 4,557,493 A | 12/1985 | Sano et al. | |
| 4,566,709 A | 1/1986 | Sano | |
| 4,566,710 A | 1/1986 | Furukawa et al. | |
| 4,566,711 A | 1/1986 | Koizumi et al. | |
| 4,582,334 A | 4/1986 | Tashiro et al. | |
| 4,583,428 A | 4/1986 | Garnier | |
| 4,610,455 A | 9/1986 | Furukawa et al. | |
| 4,613,144 A | 9/1986 | Furukawa | |
| 4,621,823 A | 11/1986 | Sano | |
| 4,647,057 A | 3/1987 | Furukawa et al. | |
| 4,647,058 A | 3/1987 | Furukawa et al. | |
| 4,648,614 A | 3/1987 | Hyodo | |

(Continued)

FOREIGN PATENT DOCUMENTS

GB    1390331    9/1975

(Continued)

*Primary Examiner*—Tony Winner
(74) *Attorney, Agent, or Firm*—Foley & Lardner LLP

(57) ABSTRACT

The vehicle steering system includes front vehicle motive members, rear vehicle motive members, a steering input device, a front steering subsystem, a rear steering subsystem and a rear steering control mechanism. The front steering subsystem is operably coupled to the steering input device and coupled to the front motive members to steer the front motive members. The rear steering subsystem is coupled to the rear motive members to steer the rear motive members. The rear steering control mechanism includes a movable input member coupled to the steering input device so as to move in response to input from the device and a movable output member coupled to the rear steering subsystem. The rear steering subsystem adjusts steering of the rear motive members in response to movement of the output member. The control mechanism operates in a rear steering state in which force is transmitted from the input member to the output member to move the output member and a dwell state in which the output member does not move in response to movement of the input member.

63 Claims, 10 Drawing Sheets

U.S. PATENT DOCUMENTS

| | | | |
|---|---|---|---|
| 4,660,844 A | 4/1987 | Yamamoto et al. | |
| 4,662,246 A | 5/1987 | Cheek et al. | |
| 4,669,745 A | 6/1987 | Miki et al. | |
| 4,705,135 A | 11/1987 | Kawamoto et al. | |
| 4,723,624 A | 2/1988 | Kawasaki et al. | |
| 4,730,839 A * | 3/1988 | Miyoshi | 180/415 |
| 4,752,078 A | 6/1988 | Ogura et al. | |
| 4,767,129 A | 8/1988 | Kawamoto et al. | |
| 4,772,036 A | 9/1988 | Sano et al. | |
| 4,779,880 A | 10/1988 | Hyodo | |
| 4,793,432 A * | 12/1988 | Tattermusch | 180/422 |
| 4,826,188 A | 5/1989 | Boberg et al. | |
| 4,832,415 A | 5/1989 | Shinomiya | |
| 4,836,566 A | 6/1989 | Birsching | |
| 4,881,748 A | 11/1989 | Sano et al. | |
| 4,902,028 A * | 2/1990 | Serizawa et al. | 180/409 |
| 4,927,166 A | 5/1990 | Takahashi et al. | |
| 5,020,812 A | 6/1991 | Sugiyama | |
| 5,048,853 A | 9/1991 | Trefz et al. | |
| 5,111,901 A | 5/1992 | Bachhuber et al. | |
| 5,137,291 A * | 8/1992 | Woods et al. | 180/408 |
| 5,217,083 A | 6/1993 | Bachhuber et al. | |
| 5,289,892 A | 3/1994 | Notsu | |
| 5,348,111 A | 9/1994 | Williams et al. | |
| 5,400,250 A | 3/1995 | Ohmura | |
| 5,417,299 A | 5/1995 | Pillar et al. | |
| 5,471,388 A | 11/1995 | Zomotor et al. | |
| 5,472,059 A | 12/1995 | Schlosser et al. | |
| 5,488,555 A | 1/1996 | Asgari et al. | |
| 5,489,004 A | 2/1996 | Shimizu et al. | |
| 5,508,921 A | 4/1996 | Chikuma et al. | |
| 5,526,895 A | 6/1996 | Shin | |
| 5,533,584 A | 7/1996 | Johnson | |
| 5,576,956 A | 11/1996 | Ashizawa et al. | |
| 5,588,931 A | 12/1996 | Forster | |
| 5,606,502 A | 2/1997 | Adachi et al. | |
| 5,607,028 A | 3/1997 | Braun et al. | |
| 5,615,117 A | 3/1997 | Serizawa | |
| 5,642,281 A | 6/1997 | Ishida et al. | |
| 5,648,903 A | 7/1997 | Liubakka | |
| 5,684,700 A | 11/1997 | Crocker | |
| 5,732,369 A | 3/1998 | Hirano | |
| 5,745,862 A | 4/1998 | Hirano | |
| 5,754,966 A | 5/1998 | Ichikawa et al. | |
| 5,799,745 A | 9/1998 | Fukatani | |
| 5,890,558 A * | 4/1999 | Keegan | 180/211 |
| 5,950,758 A | 9/1999 | Kim et al. | |
| 5,991,671 A | 11/1999 | Nishiwaki | |
| 5,996,722 A | 12/1999 | Price | |
| 6,038,500 A | 3/2000 | Weiss | |
| 6,059,056 A | 5/2000 | Becker | |
| 6,073,067 A | 6/2000 | Fujiwara et al. | |
| 6,131,689 A * | 10/2000 | Nodorft et al. | 180/409 |
| 6,134,491 A | 10/2000 | Kawagoe et al. | |
| 6,164,406 A | 12/2000 | Diekhans et al. | |
| 6,198,988 B1 | 3/2001 | Tseng | |
| 6,239,568 B1 | 5/2001 | Sugitani et al. | |
| 6,308,122 B1 | 10/2001 | Nishizaki et al. | |
| 6,366,842 B1 | 4/2002 | Kaji et al. | |
| 6,409,287 B1 | 6/2002 | Leach et al. | |
| 6,411,876 B1 * | 6/2002 | Badenoch | 701/41 |
| 6,445,987 B1 | 9/2002 | Kurishige et al. | |
| 6,450,285 B1 | 9/2002 | Horwath et al. | |
| 6,488,113 B1 | 12/2002 | Worpell et al. | |
| 6,508,330 B1 | 1/2003 | Biondi | |

FOREIGN PATENT DOCUMENTS

| | | |
|---|---|---|
| JP | 60064073 | 12/1985 |
| JP | 60064074 | 12/1985 |

* cited by examiner

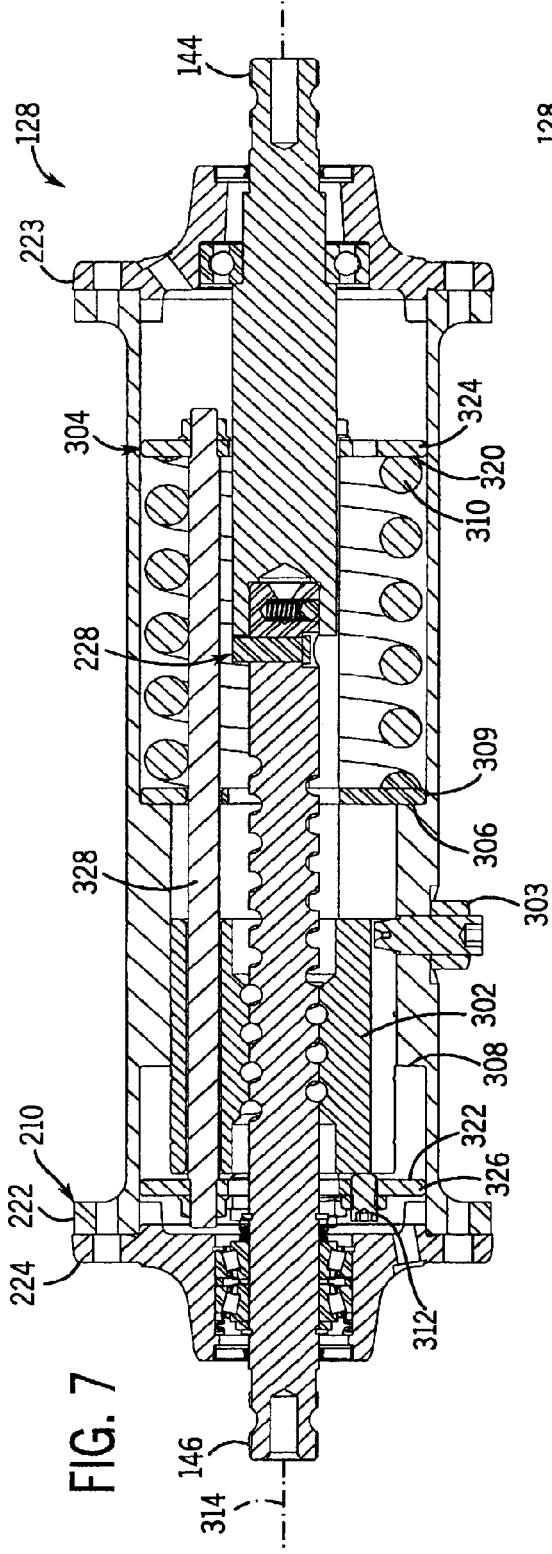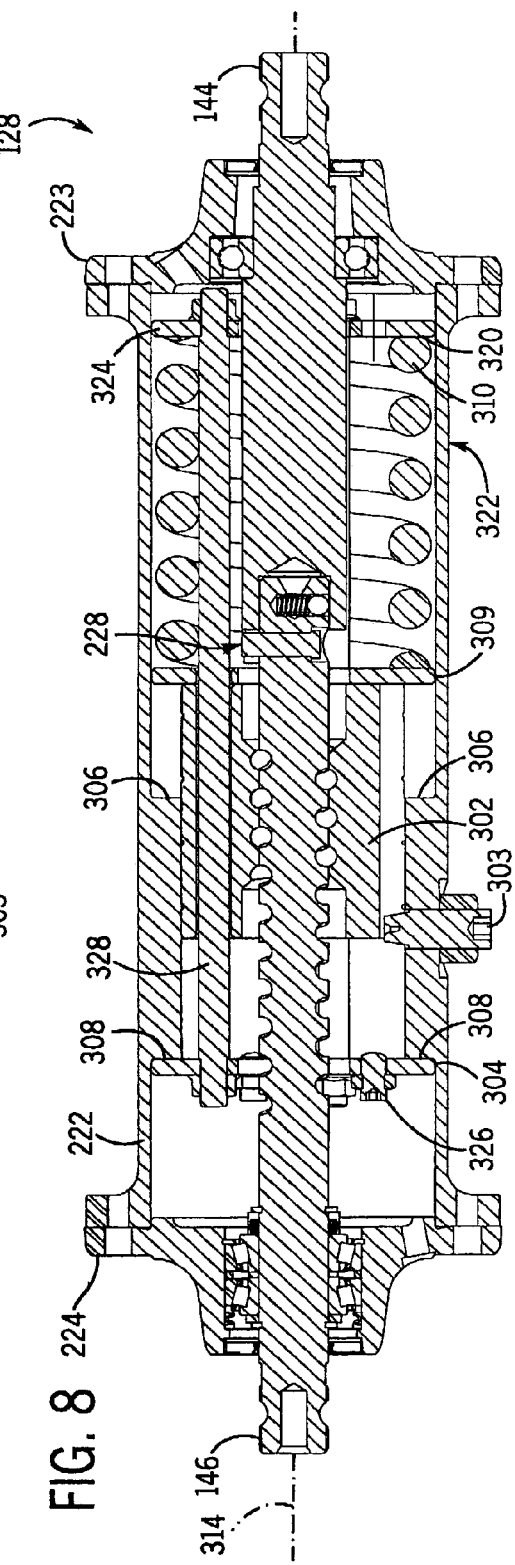

VEHICLE STEERING SYSTEM HAVING A REAR STEERING CONTROL MECHANISM

FIELD OF THE INVENTION

The present invention relates to vehicle steering systems. In particular, the present invention relates to vehicles having steerable front and rear motive members or wheels. More specifically, the present invention relates to mechanisms for controlling steering of rear motive members.

BACKGROUND OF THE INVENTION

Many vehicles today, especially heavy-duty trucks, tractors and support vehicles, are provided with all-wheel steering systems for improved maneuverability. All-wheel steering systems enable both the front axle and the rear axle of a vehicle to be steered in response to turning of a steering wheel. In one known mechanical all-wheel steering system, the rear axle and the front axle are both mechanically linked to the steering wheel such that rotation of the steering wheel results in simultaneous steering of both axles. In another known electronic steering system, the rear axle (and wheels) are steered independent of the front axles based upon sensed information regarding the front wheel and rear wheel angles. Although an improvement over known mechanical all-wheel steering systems, such electronic all-wheel steering systems are more expensive and sometimes unreliable due to the required complex electronic controls and sensors.

SUMMARY OF THE INVENTION

According to one embodiment of the present invention, a vehicle steering system includes front vehicle motive members, rear vehicle motive members, a steering input device, a front steering subsystem, a rear steering subsystem and a rear steering control mechanism. The front steering subsystem is operably coupled to the steering input device and coupled to the front motive members to steer the front motive members. The rear steering subsystem is coupled to the rear motive members to steer the rear motive members. The rear steering control mechanism includes a movable input member coupled to the steering input device so as to move in response to input from the device and a movable output member coupled to the rear steering subsystem. The rear steering subsystem adjusts steering of the rear motive members in response to movement of the output member. The control mechanism operates in a rear steering state in which force is transmitted from the input member to the output member to move the output member and a dwell state in which the output member does not move in response to movement of the input member.

According to another aspect of the present invention, a vehicle steering control mechanism is provided for use with a vehicle having a steering input device, a front steering subsystem operably coupled to the device and coupled to front motive members to steer the front motive members, and a rear steering subsystem coupled to rear motive members to steer the rear motive members. The control mechanism includes a movable input member and a movable output member. The movable input member is configured to be coupled to the steering input device so as to move in response to input from the device. The movable output member is configured to be coupled to the rear steering subsystem. The rear steering subsystem adjusts steering of the rear motive members in response to movement of the output member. The control mechanism operates in a rear steering state in which force is transmitted from the input member to the output member to move the output member and a dwell state in which the output member does not move in response to movement of the input member.

According to another aspect of the present invention, a method is provided for controlling a front steering subsystem to steer front motive members and a rear steering subsystem to steer rear motive members on a vehicle. The method includes the steps of applying a first force to a steering input device to move a portion of the device, transmitting a second force based on the first force to an input shaft of the front steering subsystem, whereby the front steering subsystem adjusts steering of the front motive members based on movement of the input shaft, and transmitting a third force based on the first force to an input member so as to move the input member through a first distance during which the input member moves relative to an output member coupled to an input shaft of the rear steering subsystem and through a second distance during which the third force is transmitted from the input member to the output member to move the output member and the input shaft of the rear steering subsystem, whereby the rear steering subsystem adjusts the steering of the rear motive members based upon movement of the output member.

According to another aspect of the present invention, a vehicle steering system includes a steering input device, a front steering subsystem, a rear steering subsystem, a first force transmission route, a steering control mechanism, a second force transmission route, and a third force transmission route. The front steering subsystem is coupled to front motive members to steer the front motive members based upon movement of a front steering subsystem input shaft. The rear steering subsystem is coupled to rear motive members to steer the rear motive members based upon movement of a rear steering subsystem input shaft. The first force transmission route extends from the steering input device to the front steering subsystem input shaft, wherein force is transmitted from the input device to the front steering subsystem input shaft to steer the front motive members. The steering control mechanism has a movable input member and a movable output member. The movable input member is movable through a first distance without transmitting force to the output member and is movable through a second distance in which force is transmitted to the output member to move the output member. The second force transmission route extends from the input device to the input member, wherein force is transmitted from the input device to the input member to move the input member. A third force transmission route extends from the output member to the rear steering subsystem input shaft to move the rear steering subsystem input shaft and to steer the rear motive members.

BRIEF DESCRIPTION OF THE DRAWINGS

FIG. 7 illustrates the rear steering control mechanism of FIG. 4 in a first non-centering position.

FIG. 8 illustrates the rear steering control mechanism of FIG. 4 in a second non-centering position.

DETAILED DESCRIPTION OF THE PREFERRED EMBODIMENTS

Figure 1:
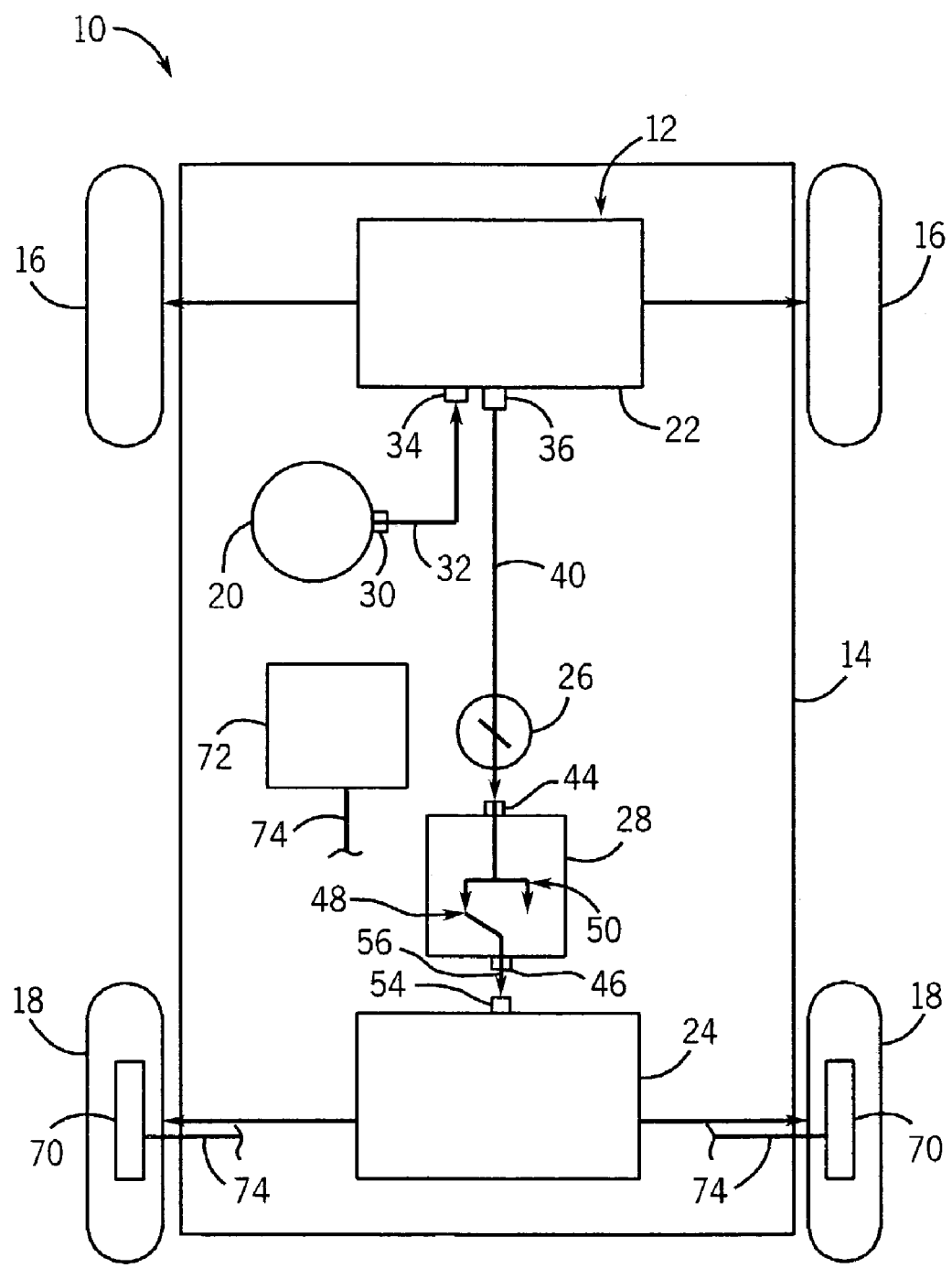
FIG. 1 is a schematic view of a vehicle including a first embodiment of a vehicle steering system.

FIG. 1 schematically illustrates a vehicle 10 including a vehicle steering system 12. In addition to steering system 12, vehicle 10 additionally includes frame 14 and means for powering or driving components or motive members of vehicle 10 or powered devices or external attachments coupled to vehicle 10. Frame 14 generally supports the remaining components or structures of vehicle 10. Frame 14 may have any one of a variety of conventionally known or future developed configurations depending upon the functions of vehicle 10. For example, in some applications, portions of frame 14 may articulate relative to other portions of frame 14.

Vehicle steering system 12 generally includes front motive members 16, rear motive members 18, steering input device 20, front steering subsystem 22, rear steering subsystem 24, ratio adjusting device 26, and rear steering control mechanism 28. Front motive members 16 and rear motive members 18 generally comprise ground motive members configured to propel or move vehicle 10. In one particular embodiment, motive members 16 and 18 comprise wheels coupled to axles (not shown). In alternative embodiments, motive members 16 and 18 may comprise other conventionally known or future developed members configured for engaging a ground, track or other surface so as to propel or suspend vehicle 10. For example, in one embodiment, motive members 16 and 18 may comprise movable tracks such as commonly employed on tanks and some tractors. Although motive members 16 and 18 are illustrated as being similar to one another, motive members 16 may alternatively be differently configured than motive members 18. For example, in one embodiment, motive members 16 may comprise wheels while motive members 18 comprise tracks.

According to one exemplary embodiment in which motive members 18 comprise wheels, motive members 18 additionally include a central tire inflation system. A central tire inflation system can be used to increase or decrease tire pressure based upon an operator input, sensor feedback, or a combination thereof. A variety of central tire inflation systems are known to those skilled in the art. One example of a central tire inflation system is the DANA® SPICER® Central Tire Inflation System commercially available from Eaton Corporation of Cleveland, Ohio.

As further shown by FIG. 1, rear motive members 18 include conventionally known or future developed wheel end speed ratio reduction final drive mechanisms 70 which are coupled to a power source or prime mover 72 by a transmission 74. Prime mover 72 generates power to drive rear motive members 18. Prime mover 72 comprises any source of rotational mechanical energy which is derived from a stored energy source such as a liquid or gaseous fuel. Examples are an internal combustion gas powered engine, a diesel engine, turbines, fuel cell driven motors, an electric motor or any type of motor capable of providing rotational mechanical energy to drive rear motive members 18 as well as to potentially drive front motive members 16.

Transmission 74 transmits the power from power source 72 to final drive mechanisms 70. In one particular embodiment, transmission 74 comprises a conventionally known or future developed mechanical transmission. In another embodiment, transmission 74 comprises a conventionally known or future developed hydrostatic transmission. In still other embodiments, transmission 74 comprises a combination hydromechanical transmission. In other embodiments, transmission 74 may comprise a hybrid transmission such as disclosed in co-pending U.S. patent application Ser. No. 10/137,585 entitled HYBRID VEHICLE WITH COMBUSTION ENGINE/ELECTRIC MOTOR DRIVE filed on May 2, 2002 by Jon J. Morrow and Christopher K. Yakes, the full disclosure of which is hereby incorporated by reference.

Final drive mechanisms 70 are generally situated within or as part of rear motive members 18 and are configured to reduce the speed ratio at the far end of transmission 74. For example, in one application where shafts extend from opposite sides of a differential to wheels comprising rear motive members 18, such shafts may be rotated at a first speed. Drive mechanisms 70 reduce the speed to increase the torque which is generally required for heavy duty wheel and track-type vehicles. Because drive mechanisms 70 are located in or formed as part of rear motive members 18, the torques required to be transmitted by the shafts extending from the differential are substantially reduced, enabling such shafts to be smaller and lighter in weight.

In one embodiment, final drive mechanisms 70 include a multi-stage planetary mechanism within the rotating housing of rear motive members 18. For example, two juxtaposed and interconnected simple planetary gear sets or stages may be used to provide the desired speed ratio reduction. In other embodiments, drive mechanisms 70 may employ a planetary gear set with a single group of cluster planet gears.

Although not illustrated, front motive members 16 may also be equipped with final drive mechanisms which are coupled to power source 72 by a transmission. Although less desirable, rear motive members 18 may alternatively omit final drive mechanisms 70, wherein any speed reduction between power source 72 and rear motive members 18 occurs along transmission 74 and within frame 14.

Steering input device 20 generally comprises a device configured to generate steering commands which are transmitted to front steering subsystem 22 and rear steering subsystem 24 for steering motive members 16 and motive members 18. In one particular embodiment, steering input device 20 includes a movable member or shaft 30 which moves in response to input to generate a steering force which is transmitted along a steering force transmission route 32 to front steering subsystem 22. The direction of the force resulting in movement of member 30 generally corresponds to the direction in which motive member 16 (and possibly motive member 18) are to be turned. The distance or angle by which member 30 is moved generally corresponds to the desired angular displacement of motive member 16 (and possibly that of motive member 18). In the particular embodiments, the exact angular displacement of motive member 16 or 18 may be proportionally increased or decreased. In one embodiment, steering input device 20 includes a steering wheel which rotates upon receiving torque from a driver of vehicle 10. The torque is transmitted along force transmission route 32 to subsystem 22. Force transmission route 32 continuously transmits the force (torque) from device 20 to subsystem 22.

In one embodiment, force transmission route 32 comprises one or more mechanical links or shafts coupled between device 20 and subsystem 22. Force transmission route 32 may additionally include force augmenting devices such as hydraulic assist. Force transmission route 32 may additionally include ratio adjusting devices configured to augment or decrement the movement or motion being transmitted along route 32. In alternative embodiments, force transmission route 32 may include hydraulic lines for transmitting force between device 20 and subsystem 22. Although less desirable, force transmission route 32 may be omitted in favor of an electronic control system which transmits steering commands in the form of electronic signals from device 20 to subsystem 22.

In lieu of including a steering wheel, input device 20 may alternatively include other means for inputting force for generating steering commands such as linearly movable input devices of the type commonly employed on skid steering vehicles. Although less desirable, steering input device 20 may alternatively include an electronic control system which, in response to electronically generated steering command or steering commands generated by the driver manually entering steering information such as by the depressment of buttons and the like, moves one or more movable members 30 to transmit the steering command by force to subsystem 22 and possibly subsystem 24.

Front steering subsystem 22 generally comprises a system coupled to front motive members 16 and configured to steer front motive members 16 in response to input from device 20. In one embodiment where steering commands are transmitted by force from input device 20, subsystem 22 includes a movable input shaft 34 which moves as a result of the force transmitted from input device 20. Movement of input shaft 34 results in the steering adjustment of motive member 16. In one embodiment, system 22 may comprise a conventionally known rack and pinion front steering arrangement wherein input shaft 34 is coupled to a pinion gear that translates a rack that is coupled to tie rods coupled to motive members 16. In an alternative embodiment, input shaft 34 comprises an input shaft coupled to a conventionally known or future developed powered steering gear which is coupled to steering arms to steer motive members 16. These and various other conventionally known or future developed systems employed for steering or turning front motive members in response to forces transmitted from a steering input may be employed.

As further shown by FIG. 1, subsystem 22 additionally includes an output shaft 36 which is also coupled to input device 20 so as to rotate in response to input from device 20. The force from output shaft 36 transmitted along a force transmission route 40 to rear steering control mechanism 28. Force transmission route 40 includes at least one mechanical link or shaft coupled between output shaft 36 and control mechanism 28. Although less desirable, force transmission route 40 alternatively utilize hydraulic lines for transmitting force between subsystem 22 and control mechanism 28.

As shown by FIG. 1, ratio device 26 is disposed along force transmission route 40. Ratio device 26 may comprise a mechanism configured to change a ratio of movement along route 40. In one embodiment, device 26 comprises a ratio-changing gear box having a 1.5 to 1.0 ratio wherein the rotation of the output member of device 26 is increased as compared to the rotation of the input member of device 26 to increase the angular displacement into control mechanism 28.

In still other embodiments, force transmission route 40 may additionally include force augmenting devices configured to augment the force transmitted from subsystem 22 to control mechanism 28. As will be described hereafter, this force may be necessary or may be beneficial to assist in overcoming the force of biasing the components of mechanism 28 from embodiments. In lieu of providing a force augmenting device along force transmission route 40, such a force augmenting device may be provided as part of subsystem 22 or may be provided as part of force transmission route 32. Examples of a force transmission augmenting device include multipliers and back driving powered slave steering gears.

Steering control mechanism 28 is included as part of the overall force transmission route from input device 20 to rear steering subsystem 24. Mechanism 28 generally includes a movable input member 44 and a movable output member 46. The movable input member 44 is coupled to input device 20 so as to move in response to input from device 20. As discussed above, force is transmitted from input device 20 through transmission routes 32, through system 22 and through force transmission route 40, to input member 44 which causes input member 44 to move. Movable output member 46 is coupled to rear steering subsystem 24, wherein the rear steering subsystem 24 adjusts steering of rear motive members 18 in response to movement of output member 46.

As schematically shown in FIG. 1, control mechanism 28 operates in two possible alternative states: (1) a rear steering state 48 and (2) a dwell state 50. In the rear steering state 48, force is transmitted from input member 44 to output member 46 to move the output member. In the dwell state 50, output member 46 does not move in response to movement of input member 44. Since high speed maneuvers only occur within a small range of front motive member steering angle, the initiation of rear steering of motive members 18 is delayed until front motive members 16 have been steered beyond small range. The extent to which front motive members 16 may be turned from a straight ahead or centered position is large enough to insure that all high speed maneuvers, such as lane changes or high speed obstacle avoidance, will occur within this window or dead-band range. However, at low speeds, the front steering dead-band is routinely exceeded such that system 12 will steer rear motive members 18 in a coordinated ratio with front motive members 16 when rear motive members 16 are steered beyond the dead-band range. As a result, steering mechanism 28 enables rear motive members 18 to be steered for improved maneuverability of vehicle 10 at low speeds while preventing steering of motive members 18 at high speeds so that high speed stability is equivalent to those vehicles without rear steering.

In the particular embodiment illustrated, system 12 is configured such that both front motive members 16 and rear motive members 18 reach their maximum steering angles at the same time. In particular, device 26 and mechanism 28 are configured such that maximum steering angles are simultaneously attained. The maximum steering angles of members 16 and 18 need not be equal.

In one particular embodiment of steering system 12, movable input member 44 and movable output member 46 of control mechanism 28 have surfaces that directly engage or contact one another in the rear steering state 48 such that force is directly transmitted from member 44 to member 46 to move output member 46. In another embodiment, output member 44 and output member 46 are indirectly coupled to one another by one or more intermediate movable physical structures, wherein member 44 directly engages at least one of the intermediate structures which in turn directly engages output member 46 to transmit force to output member 46 from input member 44 and to move output member 46 in the rear steering state 48. In still another alternative embodiment, input member 44 and output member 46 are indirectly coupled to one another by a fluid, such as hydraulic fluid, wherein movement of input member 44 applies force by a piston directly or indirectly coupled to output member 46 so as to transmit force to output member 46 and move output member 46 when control mechanism 28 is in the rear steering state.

In one particular embodiment, rear steering control mechanism 28 is additionally configured to resiliently bias output member 46 towards a centering position. In response to output member 46 being positioned in the centering position, rear steering subsystem 24 steers rear motive members 18 to a centered position or straight position. As a result, when mechanism 28 is in the dwell state, control mechanism 28 automatically repositions output member 46 to the centering position.

Rear steering subsystem 24 is coupled to rear motive members 18 and is configured to steer rear motive members 18 in response to movement of output member 46. In the particular embodiment illustrated, rear steering subsystem 24 includes an input shaft 54 coupled to output member 46 and a force transmission route 56. Force transmission route 56 is configured to transmit force from output member 46 to input shaft 54 so as to move input shaft 54. In one embodiment, force transmission route 56 comprises one or more mechanical links or steering shafts disposed between member 46 and shaft 54.

In alternative embodiments, other mechanisms may be disposed along force transmission route 56. For example, in one embodiment, ratio adjusting device 26 may alternatively be disposed between member 46 and shaft 54. In other embodiments, force augmenting devices, such as torque multipliers may be deployed between member 46 and shaft 54. Although less desirable, the transmission of force between member 46 and input shaft 54 may additionally include hydraulic lines associated with hydraulic motors/pumps for transmitting force from member 46 to shaft 54.

Rear steering subsystem 24 includes any one of a variety of conventionally known or future developed mechanisms configured to steer or turn rear motive members 18 in response to movement of input shaft 54. In one embodiment, steering subsystem 24 includes a pinion gear coupled to input shaft 54 and a rack gear in engagement with the pinion gear and coupled to motive members 18 via tie rods and knuckle arms, wherein rotation of input shaft 54 causes the rotation of the pinion gear which in turn moves the rack gear to turn motive members 18. In an alternative embodiment, steering subsystem 24 includes a hydraulically powered steering gear coupled to or including input shaft 54 so as to steer motive members 18 in response to rotation of input shaft 54. In another alternative embodiment, subsystem 24 additionally includes a hydraulic powered steering slave gear coupled to the first master hydraulic powered steering gear coupled to motive members 18 to provide additional assistance in steering motive members 18 in ultimate response to movement of input shaft 54.

Figure 2:
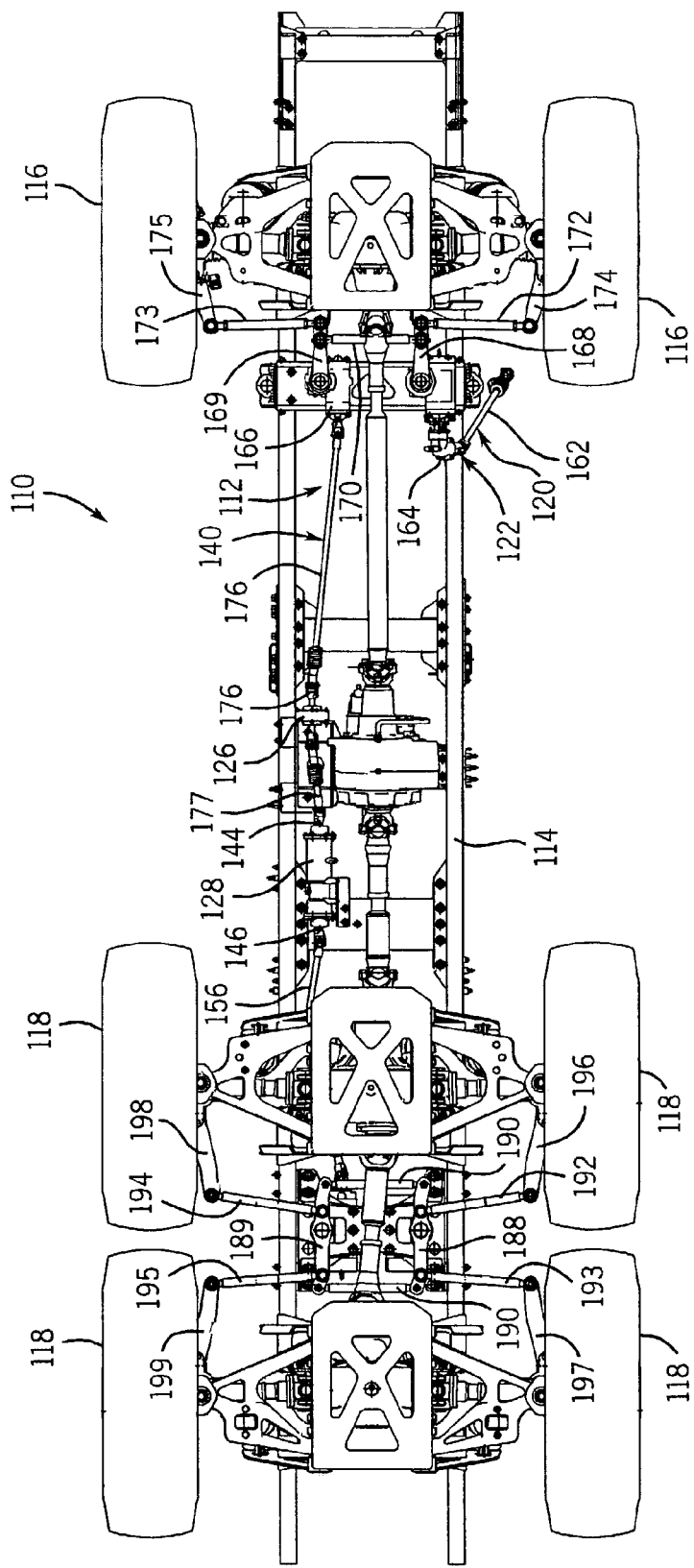
FIG. 2 is a plan view of one preferred embodiment of the vehicle shown in FIG. 1 illustrating a preferred embodiment of the steering system supported on a frame.
Figure 3:
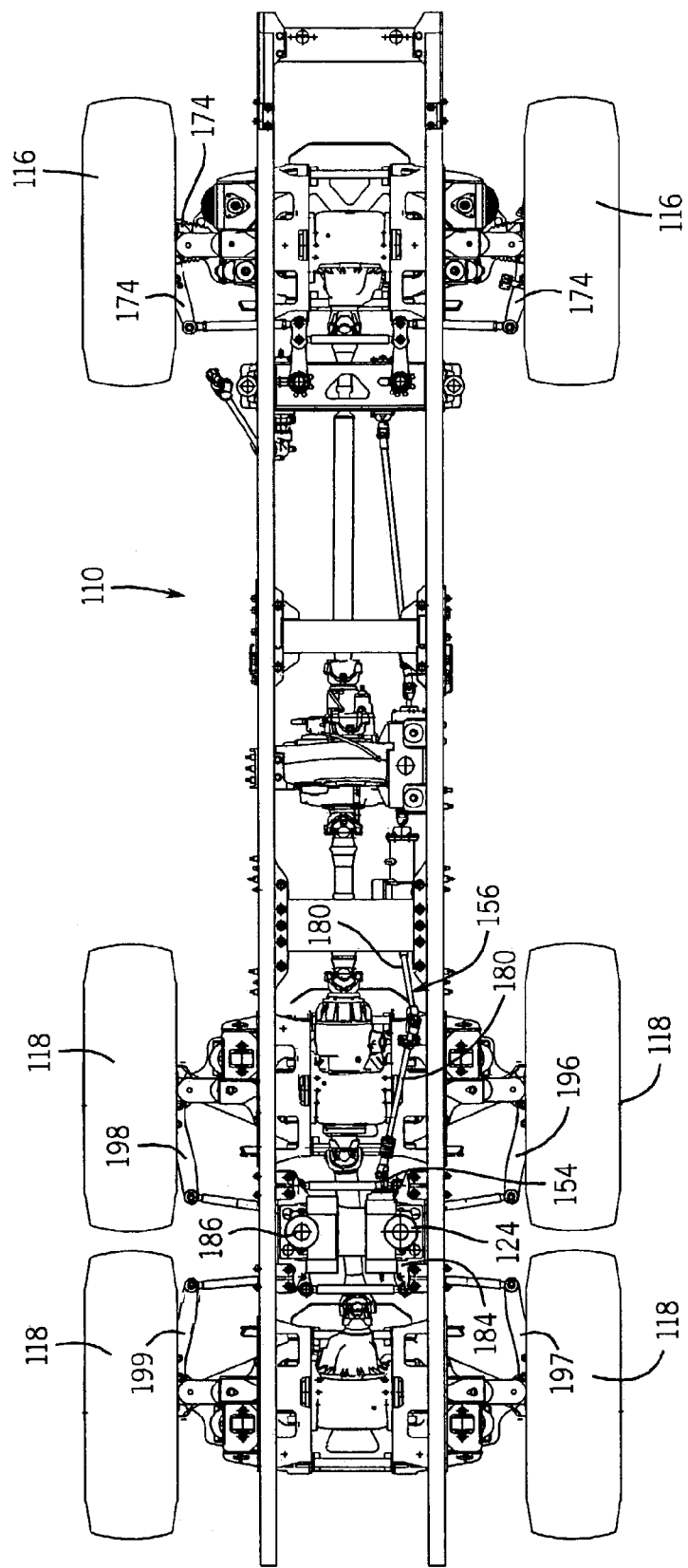
FIG. 3 is a top plan view of the vehicle of FIG. 2.

FIGS. 2 and 3 illustrate vehicle 110 including steering system 112, one preferred embodiment of vehicle 10 and system 12 shown in FIG. 1. Steering system 112 is supported by frame 114 and includes front motive members 116, rear motive members 118, steering input device 120, front steering subsystem 122, rear steering subsystem 124, ratio adjusting device 126, and rear steering control mechanism 128. Front motive members 116 and rear motive members 118 generally comprise wheels rotatably coupled to frame 114. Although vehicle 110 is illustrated as including two pairs of opposing wheels (rear axles), vehicle 110 and steering system 112 may alternatively include a single rear axle or greater than two rear axles or multiple front axles.

Steering input device 120 generally includes a steering shaft 162 coupled to a column and ultimately to a steering wheel (not shown). Steering column 162 is further coupled to front steering subsystem 22. Rotation of the steering wheel results in torque being transmitted to front steering subsystem 122.

Front steering subsystem 122 generally includes hydraulic powered steering gear 164, hydraulic powered back driving slave gear 166, Pitman arms 168, 169, tie rod 170, steering links 172, 173 and steering arms 174, 175. Steering gear 164 receives torque from device 120 and rotatably drives Pitman arm 168. As torque is applied to input shaft of gear 164 which is coupled to a ball screw/piston which is in turn coupled to an output shaft, a valve actuates and forces hydraulic fluid against the piston, with the piston rotating the output shaft. Steering gear 164 is further hydraulically coupled to back driving powered slave steering gear 166 via hydraulic lines (not shown). In the particular embodiment illustrated, powered steering gear 164 generally comprises M-series steering gear, Model No. M100, sold by R.H. Sheppard Company, 101 Philadelphia Street, Post Office Box 877, Hanover, Pa. 17331.

Back driving powered slave steering gear 166 is coupled to powered master steering gear 164. Steering gear 166 receives pressurized hydraulic fluid from steering gear 164 to drive its piston which causes rotation of its output shaft. Steering gear 166 rotatably drives Pitman arm 169. In the particular embodiment illustrated, gear 166 comprises a conventionally known back-driving slave gear, Model No. M90, sold by R.H. Sheppard Company.

Pitman arms 168 and 169 are linked by tie rod 170 so as to move with one another. Pitman arms 168 and 169 are pivotally coupled to steering links 172 and 173 which are pivotally coupled to steering arms 174 and 175. Steering arms 174 and 175 are rigidly coupled or affixed to steering knuckles of motive members 116. Rotation of Pitman arms 168 and 169 applies linear force to steering arms 174 and 175 to turn front motive members 116.

As best shown by FIG. 2, system 112 includes a force transmission route 140 including steering shafts 176 which serve as mechanical links from the output shaft of gear 166 to input member 144 and control mechanism 128. Disposed within force transmission route 140 is a ratio device 126 which generally comprises gear box having a first sized gear coupled to steering shafts 176, and a second sized gear coupled to steering shafts 177. In the particular embodiment illustrated, ratio adjusting device 126 has a steering ratio of approximately 1.5 to 1.0. As a result, for every 1.0 revolution of steering shafts 176, steering shafts 177 will rotate 1.5 revolutions.

Rear steering control mechanism 128 (which will be described in greater detail hereafter with respect to FIGS. 4–7) has an input member 144 and an output member 146. Input member 144 is rotatably driven upon receiving torque from steering shaft 177. In a rear steering state, the forces transmitted from input member 144 to output member 146 rotate output member 146. In a dwell state, output member 146 does not rotate in response to rotation of input member 144.

While in the dwell state, control mechanism 128 additionally biases output member 146 towards a predetermined position. In particular, mechanism 128 biases output member 146 towards a centering position which causes motive members 118 to be steered to a straight position.

As best shown by FIGS. 2 and 3, system 112 includes a force transmission route 156 coupled between output member 146 and input shaft 154 of rear steering subsystem 124. Transmission route 156 includes a plurality of steering shafts 180 which provide a mechanical link between output member 146 and input shaft 154.

Rear steering subsystem 124 moves rear motive members 118 in response to rotation of output member 146. In the particular embodiment illustrated, rear steering subsystem 124 steers output members 118 in response to rotation of input shaft 154. Rear steering subsystem 124 generally includes hydraulic powered master steering gear 184, hydraulic powered slave steering gear 186, double-ended Pitman arms 188, 189, tie rods 190, steering links 192, 193, 194, 195, and steering arms 196, 197, 198, and 199. Hydraulic powered steering gear 184 is substantially identical to hydraulic powered steering gear 164 except that instead of receiving torque from steering column 162 of steering input device 120, hydraulic powered steering gear 184 receives torque from one of steering shafts 180. As conventionally known, input shaft 154 is coupled to mating ball screw nut or piston which drives an output shaft. As torque is applied to the input shaft, a valve actuates hydraulic fluid against the piston to further assist in rotating the output shaft. The rotation of the output shaft helps in the pivoting of double acting Pitman arm 188 (best shown in FIG. 2).

Hydraulic powered slave steering gear 186 is substantially identical to hydraulic powered slave steering gear 166 except that steering gear 186 does not include a back driving output shaft. Steering gear 196 receives pressurized hydraulic fluid from steering gear 194 which serves as a master. The hydraulic fluid supplied to steering gear 196 is based upon the torque inputted to input shaft 154. The hydraulic fluid supplied to steering gear 186 drives a piston which drives an output shaft coupled to double acting Pitman arm 189.

Tie rods 190 are pivotally coupled to and between Pitman arms 188 and 189. Pitman arms 188 and 189 are driven in conjunction with one another by steering gears 184 and 186. Pitman arms 188 and 189 are pivotally coupled to steering links 192, 193, 194 and 195, which are pivotally coupled to steering arms 196, 197, 198 and 199. Steering arms 196, 197, 198 and 199 are rigidly coupled or affixed to steering knuckles (not shown) of motive members 118. The rotation of Pitman arms 188 and 189 linearly moves links 192, 193, 194 and 195 to pivot steering arms 196, 197, 198 and 199, respectively, so as to steer or turn rear motive members 118.

Figure 4:
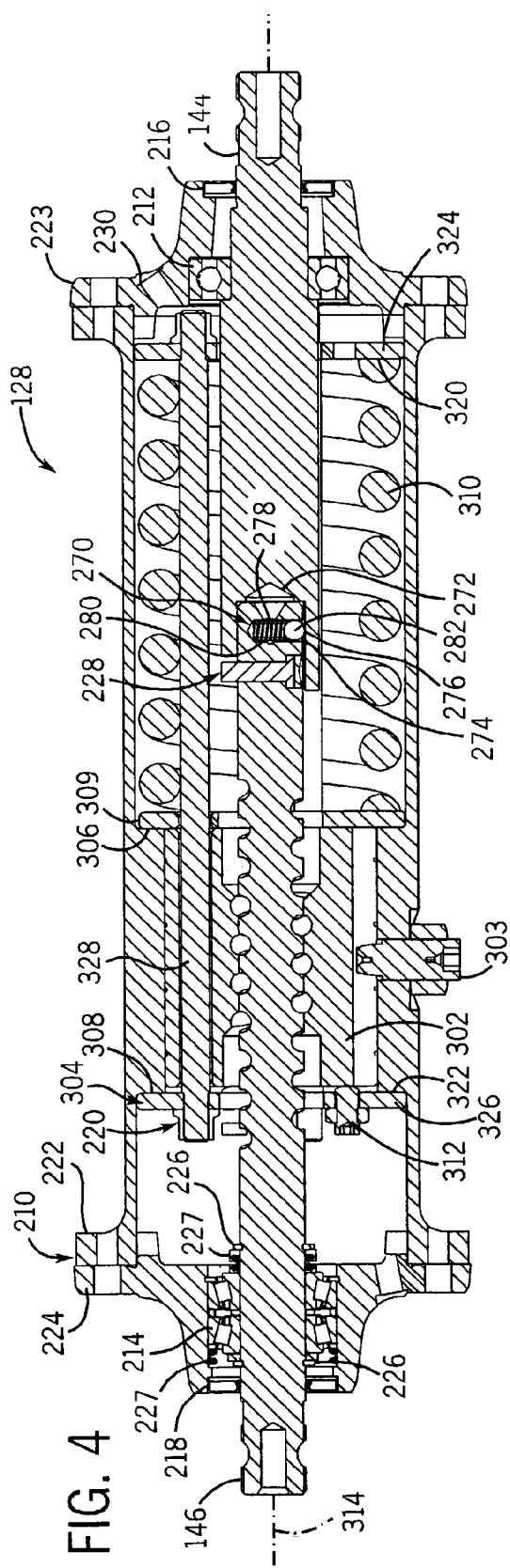
FIG. 4 is a sectional view of a rear steering control mechanism of the vehicle shown in FIGS. 2 and 3, illustrating the mechanism in a centering position.

FIGS. 4–8 illustrate rear steering control mechanism 128 in greater detail. As best shown by FIG. 4, control mechanism 128 is generally a self-contained unit including housing assembly 210, bearings 212, 214, seals 216, 218, input member 144, output member 146, and centering mechanism 220. Housing assembly 210 generally comprises a structure configured to surround and substantially enclose the remaining members of mechanism 128, as well as to rotatably support input member 144 and output member 146. Housing 222 additionally includes mounting pads (not shown) to mount mechanism 128 to a vehicle. In the particular embodiment illustrated, housing assembly 210 includes a main housing 222 and two end covers 223, 224 secured to main housing 222. In alternative embodiments, housing assembly 210 may have any one of a variety of alternative configurations with fewer or greater sections that collectively surround and support the remaining components of mechanism 128.

Bearings 212 and 214 rotatably support input member 144 and output member 146, respectively, within housing 210. Bearing 212 is situated between cover 223 and input member 144. Bearings 214 are situated between cover 224 and output member 146.

Seals 216 and 218 seal about input member 144 and output member 146, respectively, to form a sealed enclosure about dwell mechanism 228 of input member 144 and output member 146. As a result, lubricating fluid may be supplied to the interior of housing 210. In the particular embodiment illustrated, the interior of housing 210 will be approximately half full of lubricating fluid or oil if mounted horizontally. In angled installations, housing 210 will be filled to a greater extent so that bearings 212 and 216 operate in lubricating oil. Housing 210 additionally includes a vent port 230 in which a breather (not shown) is positioned. Alternatively, a remote vent line may be used.

Bearings 214 preferably comprise tapered roller bearings so as to retain output member 146 in place. Bearings 214 are preferably set with a slight amount of preload to minimize axial end play. Bearings 214 are attached to output member 146 and cover 224 with snap rings 226 and collapsible spacers 227. Bearings 212 extend about input member 144 with a minimal clearance fit. In alternative embodiments, bearings 214 are alternatively retained in place by conventionally known jam nuts.

Figure 5:
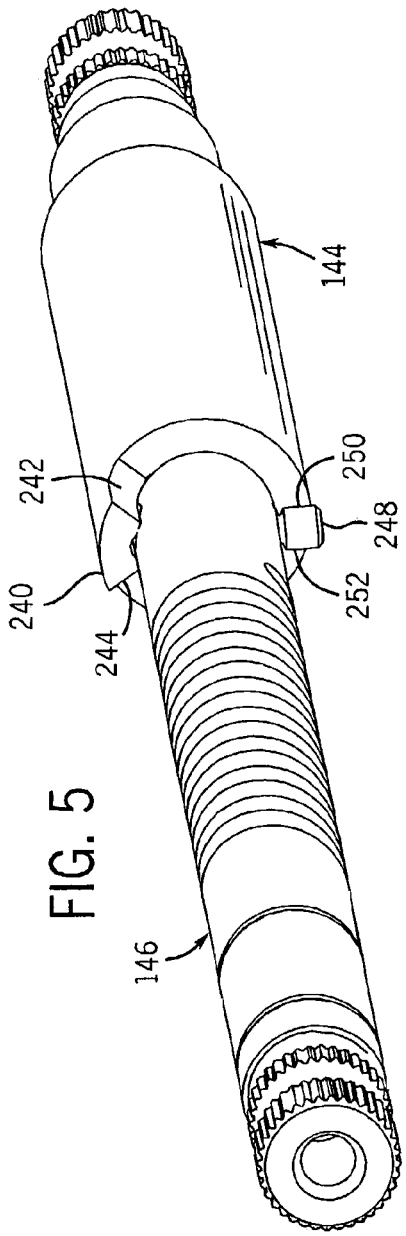
FIG. 5 is a perspective view of an input member and an output member of the rear steering control mechanism of FIG. 4.
Figure 6:
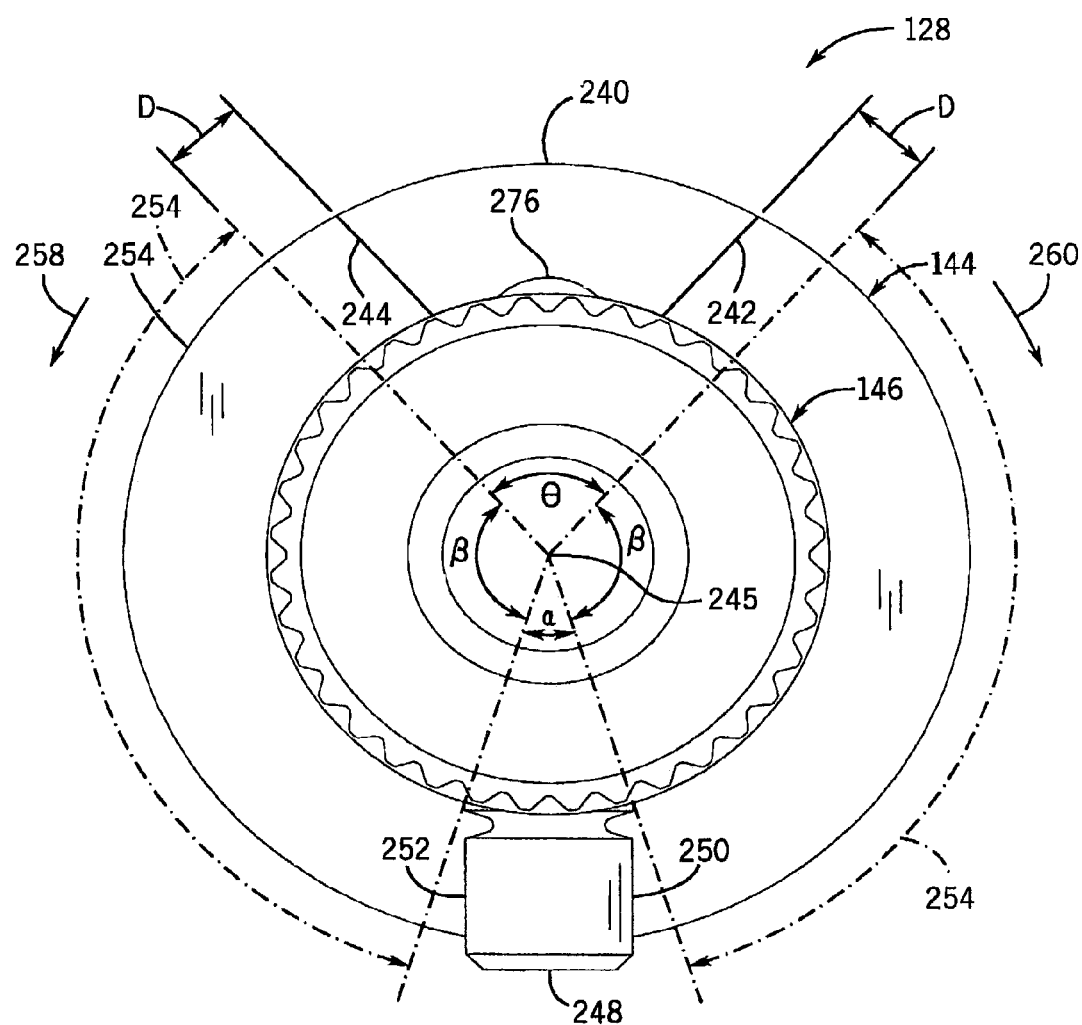
FIG. 6 is a left end elevational view of the input member and the output member shown in FIG. 5.

FIGS. 5 and 6 illustrate input member 144 and output member 146 in greater detail. As shown by FIGS. 5 and 6, input member 144 generally includes an axially projecting tang 240 which includes surfaces 242 and 244. Output member 146 includes a radially projecting shear pin 248 which is preferably sized to act as a shear device to prevent excessive torque between input member 144 and output member 146. Shear pin 248 includes surfaces 250 and 252. Surfaces 242 and 244 are angularly spaced from one another by angle $\theta$ to create a dead-band or dwell range 254 comprising the angular extent to which input member 144 may be rotated about axis 245 without surface 242 engaging surface 250 or without surface 244 engaging surface 252. The total dwell range 254 is generally equal to 360 degrees-$\theta$-$\alpha$ (the angular width separating surfaces 250 and 252).

As shown by FIG. 6, each of surfaces 242 and 244 is angularly offset from axis 245 by a distance D (the spacing between one of surfaces 242, 244 and a reference line parallel to one of surfaces 242, 244 and intersecting axis 245) equal to one half of the diameter of shear pin 248. As a result, surfaces 250 and 252 of shear pin 248 contact surfaces 242 and 244, respectively, substantially along the entire length of such surfaces. This line contact reduces wear of shear pin 248 and tang 240 and ensures more reliable dwell ranges. In the particular embodiment shown, the offset distance D is approximately 0.149 inches while pin 248 has a diameter of approximately 0.298 inches. Although less desirable, surfaces 242 and 244 may alternatively be configured to omit such an offset.

FIGS. 5 and 6 illustrate control mechanism 128 in the dwell state in which surfaces 242 and 244 are out of engagement with surfaces 250 and 252, respectively. As a result, output member 146 does not move in response to movement of input member 144. FIGS. 5 and 6 further illustrate output member 146 in a centering position which causes rear motive members 118 (shown in FIGS. 2 and 3) to be steered to a straight position. FIGS. 5 and 6 further illustrate input member 144 in a centered position, wherein front motive members 116 are also steered to a straight position. In the particular embodiment illustrated, surfaces 242 and 244 of input member 144 are equi-angularly spaced from surfaces 250 and 252, respectively, when input member 144 is in the centered position and when output member 146 is in its centering position. As a result, input member 144 may be rotated in the direction indicated by arrow 258 by β degrees or the direction indicated by arrow 260 by β degrees. In the particular embodiment illustrated, the angle θ is approximately 40 degrees and α is approximately 35 degrees, and angle β is approximately 142.5 degrees. In alternative embodiments, however, the angles θ, α and β may be varied depending upon the desired dwell range. Moreover, in alternative embodiments, input member 144 and output member 146 may be angularly repositioned relative to one another such that surfaces 242 and 244 are not equi-angularly spaced from surfaces 250 and 252, respectively, when input member 144 is in a centered position or when output member 146 is in a centering position. For example, in particular applications, it may be beneficial to have a shorter dwell range portion between surfaces 242 and 250 as compared to the dwell range portion between surfaces 244 and 252.

Once input member 144 has been rotatably driven about an angle greater than β in the direction indicated by arrow 258 and moved through the associated distance, surface 244 will contact surface 252 so as to transmit torque or force from input member 144 to output member 146. This transmitted force will result in output member 146 also being rotatably driven in the direction indicated by arrow 258 so as to cause the rotation of rear motive members 118 in a first direction. Likewise, once input member 144 has been rotatably driven about an angle greater than beta in the direction indicated by arrow 260, surface 242 will engage surface 250 so as to transmit force to output member 146 so as to rotatably drive output member 146 about axis 245 in the direction indicated by arrow 260. This resulting rotation of output member 146 will cause rear motive members 118 to be steered in a second opposite direction.

Although surfaces 242 and 244 are illustrated as being provided by a tang integrally formed as part of a single unitary body as part of input member 144, surfaces 242 and 244 may alternatively be provided by a variety of other shapes or configurations integrally formed as part of input member 144 or directly or indirectly attached to input member 144. Although surfaces 250 and 252 are illustrated as being provided by a shear pin mounted to output member 146, surfaces 250 and 252 may alternatively be provided by other structures having differing configurations which are integrally formed as part of a single unitary body with output member 146 or that are directly or indirectly attached to output member 146.

As best shown by FIG. 4, mechanism 128 additionally includes an alignment guide 270 configured to assist in the alignment of input member 144 and output member 146 relative to one another during assembly. In particular, as shown in FIG. 4, input member 144 includes a bore 272 which receives an end portion of output member 146. The bore 272 has an internal surface 274 forming a depression or detent 276. The axial end portion of output member 146 includes a bore 278 receiving a spring 280 and a detent-engaging member 282 (shown as a ball). Spring 280 resiliently urges detent-engaging member 282 into engagement with detent 276 to assist in proper angular alignment of members 144 and 146.

In alternative embodiments, alignment guide 270 may be provided with a variety of other configurations. For example, in lieu of member 144 receiving member 146, this relationship may be reversed. Furthermore, in lieu of member 144 including a detent, while member 146 includes a resiliently biased detent-engaging member, member 144 may include a resiliently biased detent-engaging member, while member 146 includes a detent.

Centering mechanism 220 generally comprises a mechanism configured to resiliently bias output member 146 to the centering position. Centering mechanism 220 generally includes nut 302, nut guide 303, carriage 304, stationary surface 306, stationary surface 308, drive structure 309, spring 310 and end play adjuster 312. Nut 302 generally comprises a structure threadably coupled to output member 146 and guided to move along axis 314 of output member 146 in conjunction with the rotation of output member 146. In the particular embodiment illustrated, nut 302 comprises a ball nut wherein output member 146 includes a ball screw portion extending through nut 302. In alternative embodiments, other types of nuts and screw arrangements may be employed.

Nut guide 303 generally comprises a structure configured to engage nut 302 so as to substantially prevent rotation of nut 302 while permitting nut 302 to move along axis 314 in conjunction with rotation of output member 146. In the particular embodiment illustrated, nut guide 303 comprises a tapered pin and jam nut passing through main housing 222 into engagement with nut 302. Although less desirable, in alternative embodiments, nut guide 303 may comprise other structures integrally formed as part of a single unitary body with housing 222 or other structures mounted to housing 222 which serves the same function.

Carriage 304 cooperates with spring 310 to resiliently bias nut 302 towards a predetermined position along axis 314 so as to also resiliently bias output member 146 towards the centering position. Carriage 304 generally includes drive face 320 and drive face 322. Drive face 320 faces a first side of nut 302 and is axially fixed relative to drive face 322 which faces a second side of nut 302. In the particular embodiment illustrated, drive face 320 is provided by a drive plate 324 while drive face 322 is provided by a guide plate 326. Plates 324 and 326 are axially fixed relative to one another by three tension rods 328 (only one of which is shown). Guide plates 324 and 326 have minimal clearance relative to the inside diameter of housing 222 to assist in maintaining alignment of spring 310 and rods 328. Tension rods 328 are mounted between plates 324 and 326 and generally pass through nut 302 and spring 310 between input member 144/output member 146 and main housing 222. Nut 302 is precisely guided by the housing 222. The rods 328 are only guided rotationally about axis 314 by nut 302. The rods are guided by plates 326 and 324. There is clearance between rods and mating holes in nut 302.

Although less desirable, in alternative embodiments, carriage 304 may include greater or fewer tension rods. Such tension rods need not necessarily pass through nut 302. In still other alternative embodiments, faces 320 and 322 may be provided by other structures other than plates and may be fixed relative to one another by other members mounted between such drive faces or other portions integrally formed as part of a single unitary body with one or both of the structures providing faces 320 and 322.

Spring 310 comprises preloaded centering spring which acts through output member 146 to provide torque to rear steering gear 184 to hold input shaft 154 of rear steering subsystem 124 in a centered position wherein rear motive members 118 are retained in a centered position. Since rear steering subsystem 124 is hydraulically powered, the amount of torque required to maintain gears 184 and 186 in a centered position is relatively low (less then 50 in.-lbs.). As a result, when the driver decides to straighten out rear motive members 118 from a steered position, the driver actuates steering input device 120 to rotate input shaft 144 in a direction allowing spring 310 to apply the necessary torque to bring rear steering subsystem 124 to a centering position. No driver's effort is required to return rear motive members 118 to the straight ahead position.

Spring 310 is captured between drive face 320 and drive structure 309. Spring 310 biases drive structure 309 against nut 302 and stationary surface 306. Spring 310 also biases drive surface 322 against nut 302 and stationary surface 308 so as to bias nut 302 and output member 146 to a centering position. In addition, spring 310 resiliently biases output member 146 against rotation.

In the particular embodiment illustrated, stationary surfaces 306 and 308 are formed along the inner surface of housing 222 as part of a single unitary body with housing 222. In alternative embodiments, stationary surfaces 306 and 308 may be provided by a single structure or multiple structures which are mounted or otherwise attached to housing 222.

Drive structure 309 generally comprises a structure slidably supported within housing 222 for movement along axis 314 and positioned between spring 310 and nut 302. Drive structure 309 is configured to abut stationary surface 306 such that the movement of drive structure 309 towards cover 224 is limited. Drive structure 309 acts as an interface between nut 302 and spring 310. In the particular embodiment illustrated, drive structure 309 does not perform any guiding function and its outer diameter does not contact housing 222.

End play adjuster 312 generally comprises a device configured to minimize or eliminate axial end play of nut 302 to prevent rotary play of output member 146 and to axially maintain straight ahead steering alignment of rear motive members 18. In the particular embodiments illustrated, adjuster 312 is provided by three set screws and jam nuts (only one set of which is shown) which thread into and through plate 326 into engagement with nut 302 to take up any clearance between nut 302 and surfaces 306 and 308. In alternative embodiments, the three set screws and jam nuts may alternatively be provided on drive structure 309. In lieu of comprising set screws and jam nuts, adjustment adjuster 312 may utilize a variety of other conventionally known or future developed structures configured for taking up tolerance between nut 302 and surfaces 306, 308.

FIGS. 7 and 8 illustrate steering mechanism 128 in the rear steering state in which input member 144 has transmitted torque to output member 146 to rotate output member 146 out of its centering position against the bias of spring 310. FIG. 7 illustrates the rotation of output member 146 in a first clockwise direction, while FIG. 8 illustrates rotation of output member 146 in a second counterclockwise direction. FIG. 7 illustrates input member 144 rotated so as to rotatably drive output member 146 in a clockwise direction. As a result of the rotation of output member 146, nut 302 has been moved along axis 314 towards cover 224. During such movement, nut 302 directly or indirectly engages drive face 322, depending upon whether adjuster 312 is in play, to move carriage 304 along axis 314 towards cover 224. Consequently, drive face 320 is also moved towards cover 224 while compressing spring 310 against drive structure 309.

FIG. 8 illustrates rotation of input member 144 and output member 146 in a counterclockwise direction which causes nut 302 to move along axis 314 in a direction towards cover 223. As a result, nut 302 engages drive structure 309 and moves drive structure 309 along axis 314 to compress spring 310 against drive face 320. As shown by FIGS. 7 and 8, centering mechanism 220 resiliently biases output member 146 towards the centering position shown in FIG. 4. This is accomplished utilizing a single spring 310.

Figure 9:
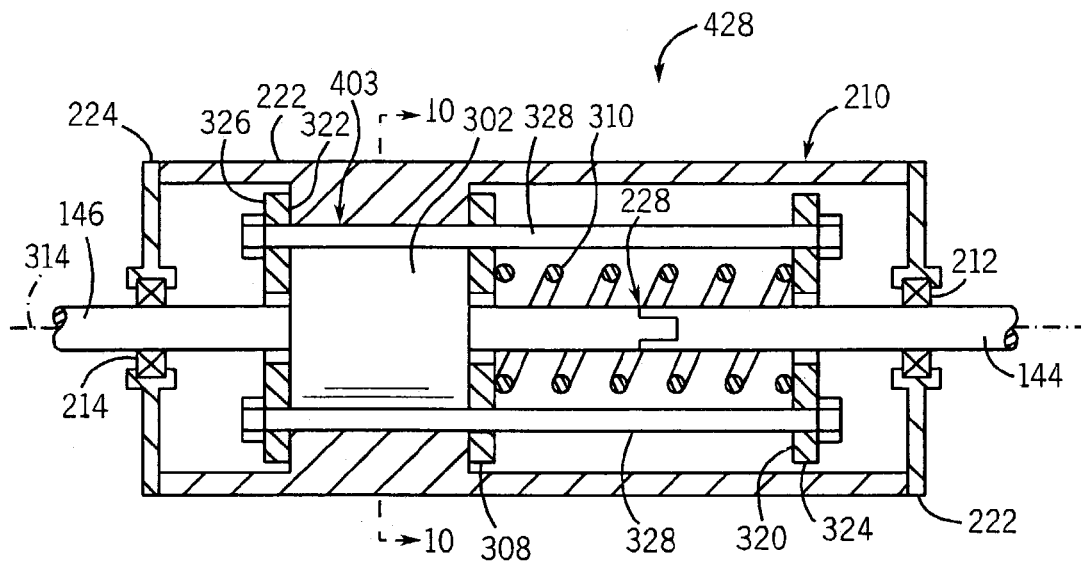
FIG. 9 is a sectional view of a first alternative embodiment of the rear steering control mechanism of FIG. 4.
Figure 10:
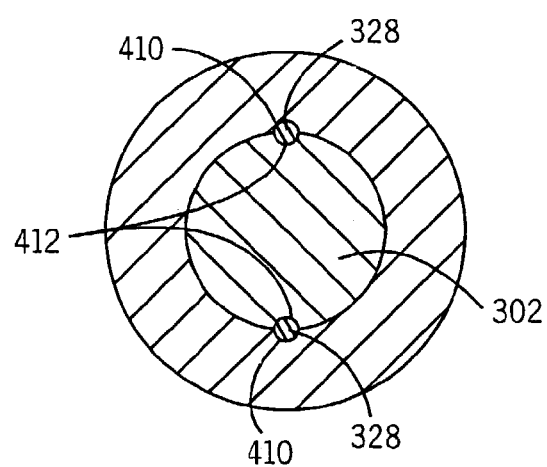
FIG. 10 is a sectional view of the mechanism of FIG. 9 taken along line 10—10.

FIGS. 9–13 illustrate alternative embodiments of centering mechanism 220. FIGS. 9 and 10 schematically illustrate rear steering control mechanism 428, an alternate embodiment of control mechanism 128. Control mechanism 428 is substantially similar to control mechanism 128 except that mechanism 428 includes nut guide 403 in lieu of nut guide 303. Nut guide 403 generally consists of at least one semi-cylindrical groove 410 formed within housing 222 and an opposite semi-cylindrical groove 412 formed within nut 302. Grooves 410 and 412 cooperate to receive one of rods 328. As shown by FIG. 9, rods 328 extend about a perimeter of spring 310 rather than through spring 310. Rods 328 guide movement of nut 302 along axis 314 in conjunction with the rotation of output member 146 while preventing rotation of nut 302. The remaining functions of mechanism 428 are substantially similar to mechanism 128.

Figure 11:
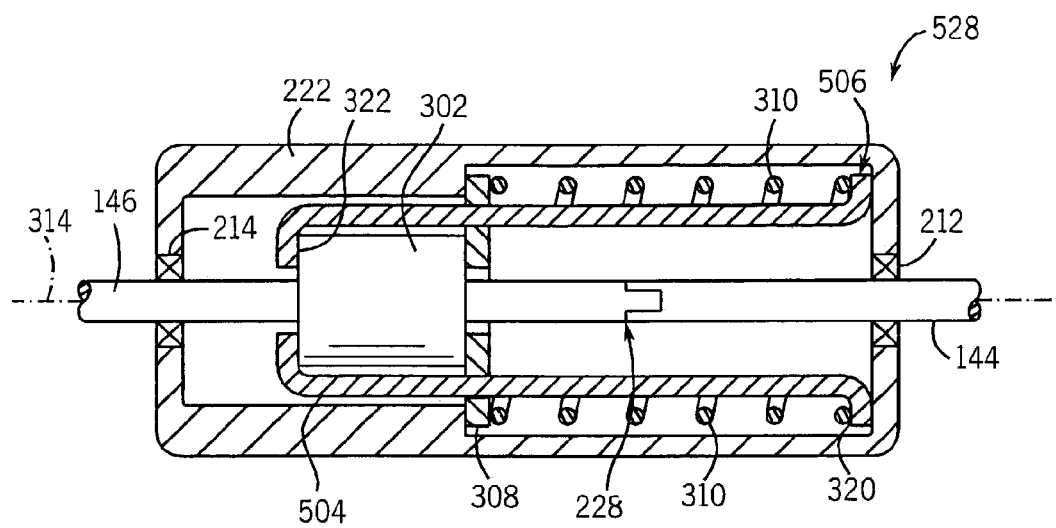
FIG. 11 is a sectional view of a second alternative embodiment of the rear steering control mechanism of FIG. 4.

FIG. 11 illustrates rear steering control mechanism 528, a second alternative embodiment of steering system 128. Steering mechanism 528 is substantially similar to steering mechanism 128 except that steering mechanism 528 utilizes an alternative carriage 504 in which drive faces 320 and 322 are provided as part of an elongate unitary sleeve extending about nut 302. Although not illustrated, portion 506 of carriage 504 comprising a sleeve that extends about nut 302 is preferably keyed to nut 302 to enable nut 302 to move along axis 314 without rotating in conjunction with the rotation of output member 146. The internal configuration of housing 222 engages and guides movement of carriage 504 along axis 314 while preventing rotation of carriage 504.

Figure 12:
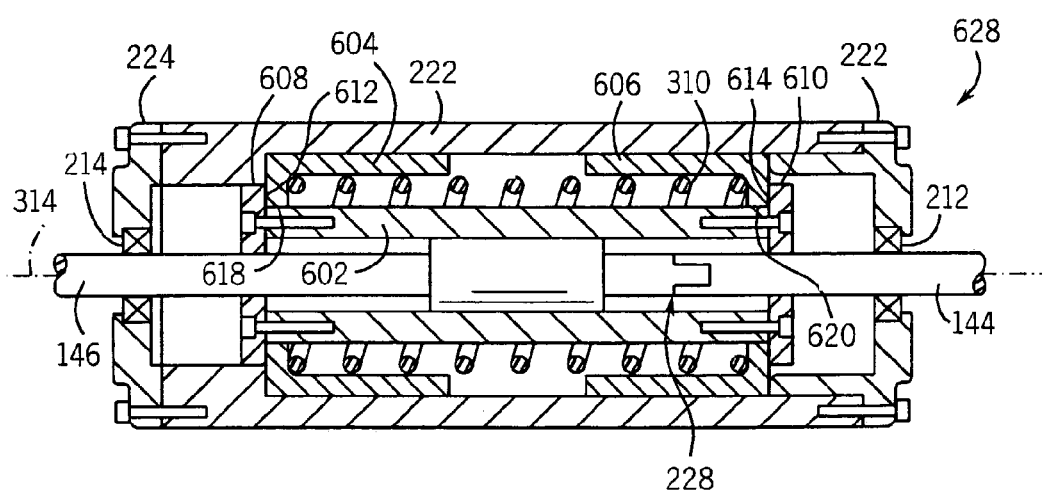
FIG. 12 is a sectional view of a third alternative embodiment of the rear steering control mechanism of FIG. 4.

FIG. 12 schematically illustrates rear steering control mechanism 628, a third alternative embodiment of mechanism 128. Mechanism 628 is similar to mechanism 128 except that mechanism 628 includes nut 602 in lieu of nut 302 and spring compression members 604, 606 in lieu of carriage 304. Nut 602 is similar to nut 302 in that nut 602 is threadably coupled to output member 146. Like nut 302, nut 602 preferably comprises a ball screw nut threadably engaging the ball screw portions of output member 146. Nut 602 includes end portions 608 and 610 which have faces 612 and 614 that face one another and that engage compression members 604 and 606. Portions 608 and 610 are preferably keyed to housing 222 to prevent movement of nut 602 along axis 314 while rotation of nut 602.

Alternatively, mechanism 628 may include a nut guide 303 passing through housing 222 into engagement with either portion 608 or 610. Although portions 608 and 610 are illustrated as being mounted to the remainder of nut 602, portions 608 and 610 may alternatively be integrally formed as part of a single unitary body with nut 602. In still another alternative embodiment, nut 602 may be keyed with one or both of compression members 604 and 606 wherein one or both of compression members 604 and 606 are also keyed with respect to housing 222 to enable movement of nut 602 along axis 314 without rotation of nut 602.

Compression members 604 and 606 extend on opposite axial end portions of spring 310 and at least partially circumscribe nut 602. Compression member 604 includes an end portion 618 captured between spring 310 and face 612. Similarly, compression member 606 includes an end portion 620 captured between spring 310 and face 614 of nut 602. Movement of nut 602 along axis 314 out of a centering position causes one of faces 612 or 614 (depending upon the direction of movement of nut 602) to engage one of compression members 604 or 606 so as to compress spring 310. Once input member 144 is rotated out of force transmitting engagement with output member 146, spring 310 acts upon one of members 604, 606 to return nut 602 to the centering position, whereby output member 146 is also rotated to the centering position.

Figure 13:
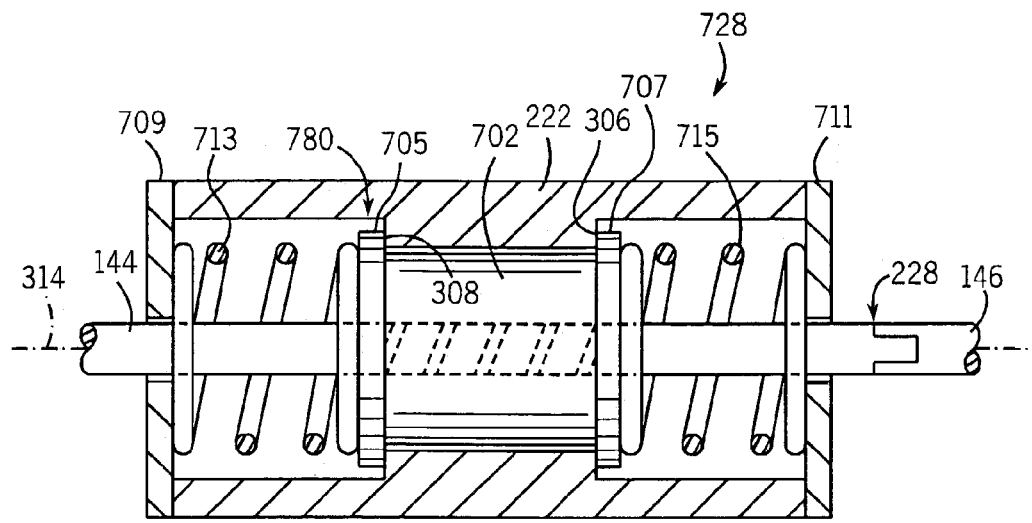
FIG. 13 is a sectional view of a fourth alternative embodiment of the rear steering control mechanism of FIG. 4.

FIG. 13 schematically illustrates rear steering control mechanism 728, a fourth alternative embodiment of mechanism 128. Steering mechanism 728 is similar to steering mechanism 128 except that steering mechanism 728 includes centering mechanism 780 in lieu of centering mechanism 220. Centering mechanism 780 includes nut 702, backing plates 705, 707, end plates 709, 711, and compression springs 713, 715. Nut 702 is substantially identical to nut 302. Nut 702 is threadably coupled to output member 144 so as to axially move along axis 314 in conjunction with the rotation of output member 144. Although not shown, mechanism 728 additionally includes a nut guide substantially identical to nut guide 303 in FIG. 4, wherein the nut guide passes through a portion of housing 222 and is in engagement with nut 702 so as to prevent rotation of nut 702 while permitting movement of nut 702 along axis 314.

In operation, the rotation of output member 144 away from a centering position results in movement of nut 702 either to the left or to the right along axis 314 depending upon the direction in which output member 144 is rotated. For example, movement of nut 702 to the left will cause nut 702 to move backing plate 705 along axis 314 towards end plate 709 to compress spring 713. Similarly, movement of nut 702 to the right will result in backing plate 707 being moved along axis 314 to compress spring 715 against end plate 711. Rotation of input member 146 out of force transmitting engagement with input member 144 enables one of springs 713, 715 to resiliently return nut 702 to the centering position shown in FIG. 13 which results in output member 144 also being rotated to the centering position.

In the particular embodiment illustrated, end plates 709 and 711 are formed as discrete plates stationarily supported within housing 222 through which output member 144 extends. Although not shown, housing 222 also preferably surrounds and encloses dwell mechanism 228 between input member 146 and output member 144. Although less desirable, in alternative embodiments, end plates 709 and 711 may be provided as end covers of housing 222.

Figure 14:
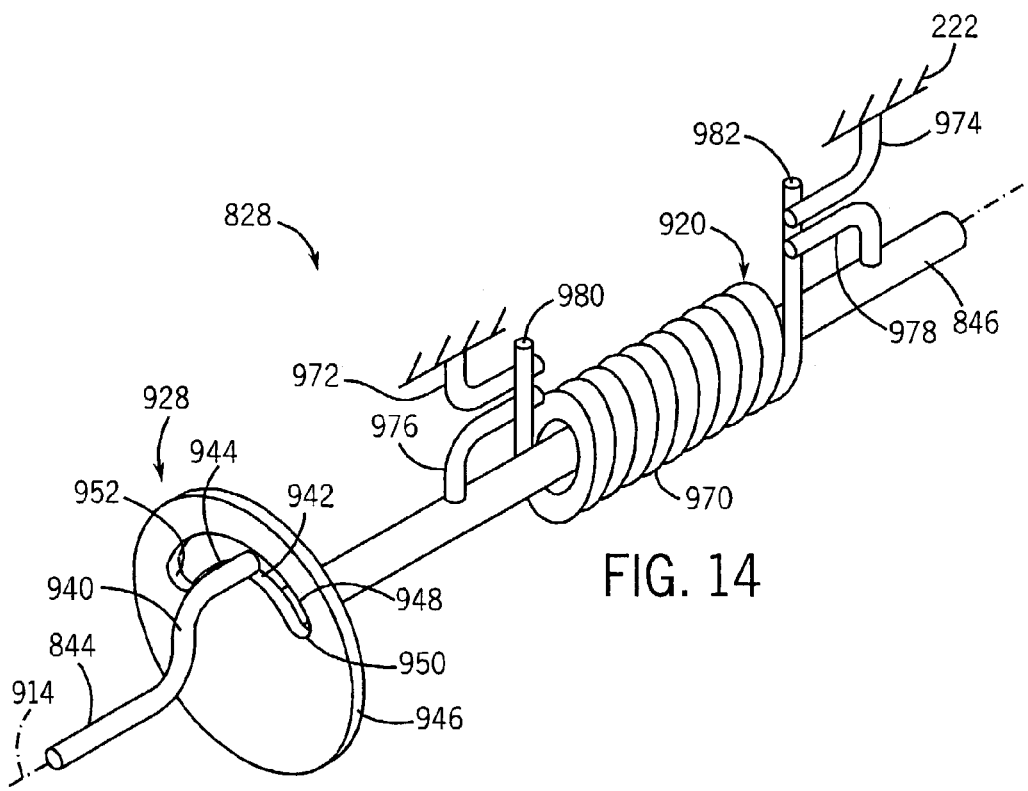
FIG. 14 is a fragmentary perspective view of a fifth alternative embodiment of the rear steering control mechanism of FIG. 4.

FIG. 14 schematically illustrates rear steering control mechanism 828, a fifth alternative embodiment of mechanism 128. Mechanism 828 includes input member 844, output member 846, and centering mechanism 920. Input member 844 and output member 846 are joined by a dwell mechanism 928. Dwell mechanism 928 includes an engagement arm 940 having opposing surfaces 942, 944 and output portion 946 having a slot 948 defining surfaces 950 and 952. Arm 940 is coupled to or integrally formed as part of input member 844 so as to rotate with input member 844. Input member 844 is analogous to input member 144 of system 128. Output portion 946 is coupled to or integrally formed as part of output member 846 so as to rotate with output member 846. Arm 940 projects through slot 948 such that sufficient rotation of input member 844 results in either surface 942 engaging surface 950 or surface 944 engaging surface 952. In the rear steering state, one of surfaces 942, 944 is in engagement with one of surfaces 950, 952, respectively, to transmit force from input member 844 to output member 846 and so as to rotate output member 846. In the dwell state, surfaces 942 and 944 are both out of engagement with surfaces 950 and 952. Although slot 948 is illustrated as angularly extending about axis 914 by approximately 160 degrees, the extent to which slot 948 extends about axis 914 may be modified depending upon the desired dead-band range of dwell mechanism 928.

Centering mechanism 920 generally includes spring 970 and impact shafts 972, 974, 976 and 978. Spring 970 generally comprises a torsional spring having opposite end portions 980 and 982. Impact shafts 972 and 974 are stationarily supported by housing 222 or other supporting structures and extend into engagement with end portions 980. Shaft 972 engages end portion 980 on a side of end portion 980 closest to axis 914 while shaft 974 engages end portion 982 on a side of end portion 982 distant from axis 914. Impact shafts 976 and 978 extend from output member 846 and also engage end portions 980 and 982 of spring 970. Shaft 976 engages the side of end portion 980 closest to axis 914 while shaft 978 engages end portion 982 on a side of end portion 982 distant from axis 914. As a result, rotation of output member 846 out of a centering position acts against spring 970. Rotation of input member 844 towards the centering position shown in FIG. 14 enables torsion spring 970 to act against shafts 976 and 978 so as to rotate output member 846 to the original centering position.

Figure 15:
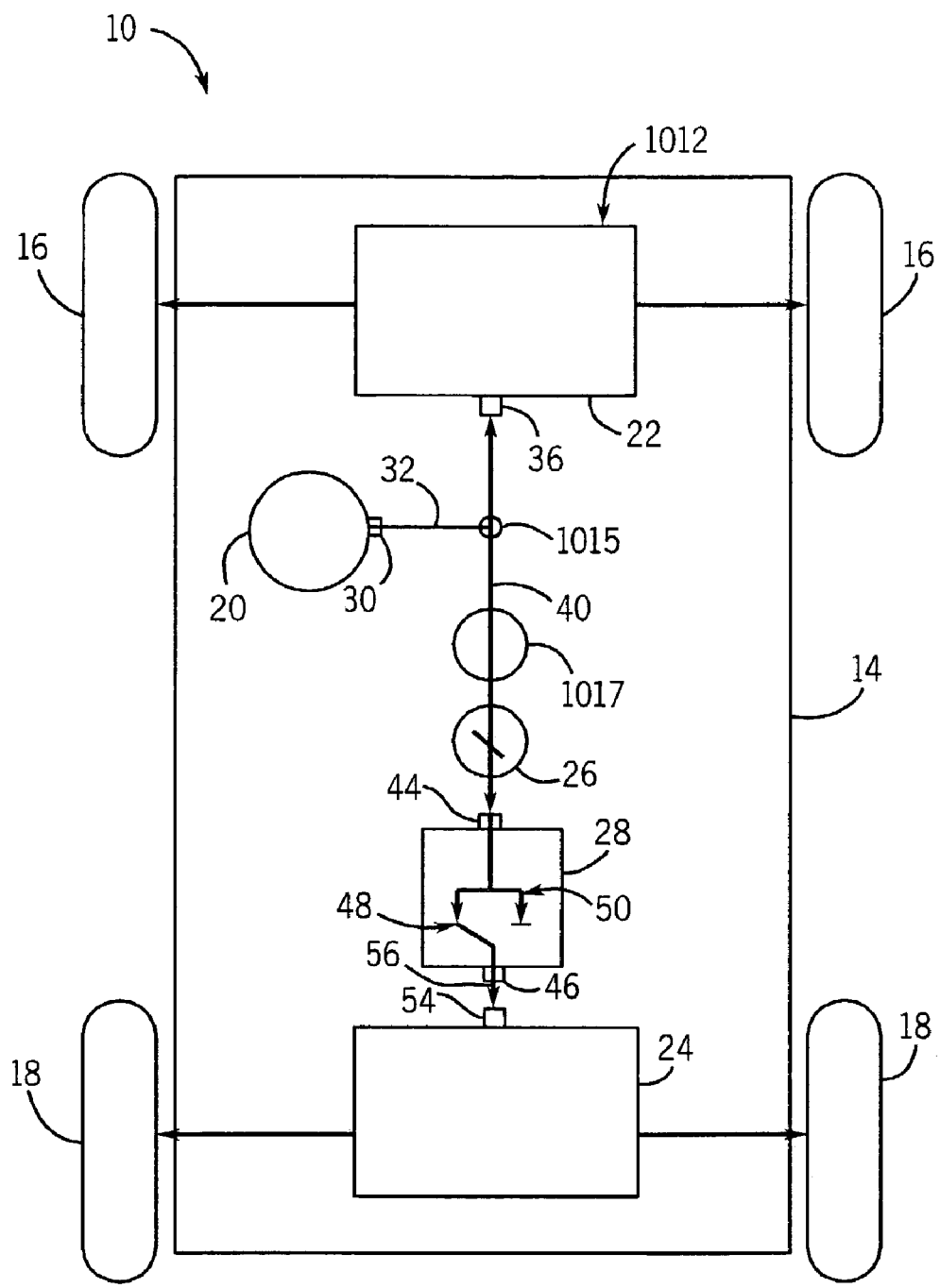
FIG. 15 is a schematic illustration of a vehicle including a second alternative embodiment of the steering system of FIG. 1.

FIG. 15 schematically illustrates vehicle 10 including steering system 1012, an alternative embodiment of steering system 112 shown in FIG. 1. Steering system 1012 is substantially identical to steering system 112 except that steering system 1012 transmits force from output shaft 30 of input device 20 to input member 44 of rear steering control mechanism 28 without transmitting such force through front steering subsystem 22. In one embodiment, steering system 1012 includes a torque splitting device 1015 configured to simultaneously transmit torque from output shaft 30 to both input shaft 36 of front steering subsystem 22 and to rear steering control mechanism 28. In one embodiment, device 1015 comprises a series of gears for dividing torque from output shaft 30. In the particular embodiment illustrated, device 1015 preferably comprises a tee gear box which splits hand wheel output torque from input device 20 between front steering subsystem 22 and rear steering subsystem 24. Although devices 1015 and 26 are illustrated as distinct components, in alternative embodiments, torque splitting device 1015 and ratio device 26 can be combined. For example, a tee gear box that has a 1:1.5 speed ratio between force transmission route 32 and force transmission route 40 may be employed (ratio device 26 is then omitted).

As further shown by FIG. 15, steering system 1012 additionally includes force augmenting device 1017 disposed along force transmission route 40 which now runs from device 1015 to control mechanism 28. In the particular embodiment illustrated, force augmenting device 1017 is configured to augment the torque being transmitted along force transmission route 40. As a result, augmenting device 1017 augments the torque being transmitted along route 40 from output shaft 30 to a sufficient extent so as to overcome the one or more springs employed in the centering mechanism of control mechanism 28. In one particular embodiment, force augmenting device 1017 comprises an in-line hydraulic torque multiplier such as the 227 Series Geroler unit sold by Eaton Corporation of 14615 Lone Oak Road, Eden Prairie, Minn. 55344. As a result, device 1017 provides sufficient torque to overcome any centering spring while not adding significantly to the driver's effort. In alternative embodiments where mechanism 228 omits a centering mechanism such as centering mechanism 220, force augmenting device 1017 may be omitted.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A vehicle steering system comprising:
   front vehicle motive members;
   rear vehicle motive members;
   a steering input device;
   a front steering subsystem operably coupled to the steering input device and coupled to the front motive members to steer the front motive members;
   a rear steering subsystem coupled to the rear motive members to steer the rear motive members; and
   a rear steering control mechanism including:
   a movable input member coupled to the steering input device so as to move in response to input from the device;
   a movable output member coupled to the rear steering subsystem, wherein the rear steering subsystem adjusts steering of the rear motive members in response to movement of the output member, wherein the control mechanism operates in a rear steering state in which force is transmitted from the input member to the output member to move the output member and a dwell state in which the output member does not move in response to movement of the input member; and
   a force transmission route from the input device to the input member, wherein the force transmission route includes a force augmenting device, wherein the force augmenting device includes at least one powered steering gear having an output shaft coupled to the input member.

2. The system of claim 1, wherein the input member rotates in response to input from the device.

3. The system of claim 2, wherein the output member rotates when the mechanism is in the rear steering state.

4. The system of claim 1, wherein the output member rotates when the mechanism is in the rear steering state.

5. The system of claim 1, wherein the input device includes a steering wheel and wherein the input member rotates in response to rotation of the steering wheel.

6. The system of claim 1, wherein the front steering subsystem includes an output shaft that moves in response to input from the device and wherein the output shaft is coupled to the input member so as to transmit force to the input member.

7. The system of claim 6 including a ratio device coupled between the output shaft and the input member to proportionally move the input member in response to movement of the output shaft.

8. The system of claim 6, wherein the front steering subsystem includes a first front powered steering gear having an input shaft coupled to the input device, wherein the first front powered steering gear is coupled to the front motive members.

9. The system of claim 8, wherein the first front powered steering gear is coupled to the output shaft.

10. The system of claim 9 including a second front powered steering gear coupled between the output shaft and to the first front powered steering gear, wherein the second front powered steering gear drives the output shaft.

11. The system of claim 10, wherein the second front powered steering gear is coupled to the front motive members to assist in steering the front motive members.

12. The system of claim 1, wherein the control mechanism forms part of a force transmission route from the input device to the rear steering subsystem.

13. The system of claim 12, wherein the force transmission route includes a ratio device.

14. The system of claim 12, wherein the force transmission route includes at least one mechanical link.

15. The system of claim 1 including at least one mechanical link between the front steering subsystem and the input member.

16. The system of claim 1 including at least one mechanical link configured to transmit force rearwardly from proximate the input device to the input member.

17. The system of claim 1, wherein the rear steering subsystem includes a first rear powered steering gear coupled to the output member and to the rear motive members to steer the rear motive members.

18. The system of claim 17, wherein the rear steering subsystem includes a second rear powered steering gear coupled to the rear motive members to assist in steering the rear motive members.

19. The system of claim 1, wherein at least one of the front motive members and the rear motive members includes wheels.

20. The system of claim 1, wherein the steering input device includes a steering wheel.

21. The system of claim 1, wherein the input member includes a first surface, wherein the output member includes a second surface, and wherein the first surface and the second surface engage one another during the rear steering state and wherein the first surface and the second surface are out of engagement during the dwell state.

22. The system of claim 21, wherein the input member rotates in response to input from the device and wherein the output member rotates when the mechanism is in the rear steering state.

23. The system of claim 1, wherein the input member includes a first surface and a second surface, wherein the output member includes a third surface and a fourth surface, wherein the first surface engages the third surface in the rear steering state to move the output member in a first direction, wherein the second surface engages the fourth surface during the rear steering state to move the output member in a second direction, and wherein the first and second surfaces are out of engagement with the third and fourth surfaces, respectively, during the dwell state.

24. The system of claim 23, wherein the input member rotates about an axis and wherein the first and second surfaces are angularly spaced about the axis to form a dead band angle about the axis in which the input member may rotate while in the dwell state.

25. The system of claim 24, wherein the dead band angle is approximately 285 degrees.

26. The system of claim 1, wherein the rear motive members are biased towards a predetermined position while the control mechanism is in the dwell state.

27. The system of claim 26, wherein the rear motive members are biased towards a straight position while the control mechanism is in the dwell state.

28. The system of claim 1, wherein the output member is biased towards a centering position and wherein the rear steering subsystem steers the rear mounting members to a straight position in response to the output member being in the centering position.

29. The system of claim 28, wherein the control mechanism includes a spring coupled to the output member to bias the output member to the centering position.

30. The system of claim 1, wherein the input device is rotated to generate a first torque and wherein the force augmenting device augments the first torque to a second larger torque.

31. The system of claim 1, wherein the force augmenting device includes at least one hydraulic torque multiplier.

32. The system of claim 1, wherein the control mechanism includes:
at least one stationary surface;
a nut threadably coupled to the output member; and
at least one spring coupled between the at least one stationary surface and the nut, wherein the at least one spring biases the nut and the output member to a centering position, wherein the rear steering subsystem steers the rear motive members to a straight position in response to the output member being moved to the centering position.

33. A system of claim 32 including a housing assembly at least partially about the input member, the output member, the nut and the at least one spring, wherein the housing provides the at least one stationary surface.

34. The system of claim 1 including:
a nut threadably coupled to the output shaft and guided to move along an axis of the output shaft in conjunction with rotation of the output shaft;
a carriage having a first drive face facing a first side of the nut and a second drive face fixed to the first drive face while facing a second side of the nut, wherein the carriage moves along the axis;
a first stationary surface facing the first drive face;
a second stationary surface axially spaced from the first stationary surface and facing the second drive face;
a drive structure between the nut and the first drive face, wherein the structure is movable along the axis between the first drive face and the first stationary surface; and
a spring captured between the first drive face and the drive structure, wherein the spring biases the drive member against the nut and the first stationary surface and wherein the spring biases the second drive face against the nut and the second stationary surface to bias the nut and the output member to a center position and to resiliently bias the output member against rotation, wherein the positioning of the output in the centering position results in the rear motive members being positioned in a straight position.

35. The system of claim 34 including a housing rotatably supporting the input member and the output member while providing the first stationary surface and the second stationary surface, wherein the housing guides movement of the first drive face and the second drive face along the axis and wherein the housing further guides movement of the nut along the axis.

36. The system of claim 35, wherein the housing provides a sealed enclosure about a carriage, a nut, the spring and a junction area between the input member and the output member, wherein the sealed enclosure is at least partially filled with a lubricating fluid.

37. A vehicle steering control mechanism for use with a vehicle having a steering input device, a front steering subsystem operably coupled to the device and coupled to front motive members to steer the front motive members, a rear steering subsystem coupled to rear motive members to steer the rear motive members, the control mechanism comprising:
a movable input member configured to be coupled to the steering input device so as to move in response to input from the device;
a movable output member configured to be coupled to the rear steering subsystem, wherein the rear steering subsystem adjusts steering of the rear motive members in response to movement of the output member, wherein the control mechanism operates in a rear steering state in which force is transmitted from the input member to the output member to move the output member and a dwell state in which the output member does not move in response to movement of the input member;
at least one stationary surface;
a nut threadably coupled to the output member; and
at least one spring coupled between the at least one stationary surface and the nut, wherein the at least one spring biases the nut and the output member to a centering position, wherein the rear steering subsystem steers the rear motive members to a straight position in response to the output member being moved to the centering position.

38. The control mechanism of claim 37, wherein the input member rotates.

39. The control mechanism of claim 38, wherein the output member rotates when the mechanism is in the rear steering state.

40. The control mechanism of claim 37, wherein the output member rotates when the mechanism is in the rear steering state.

41. The control mechanism of claim 37, wherein the input member includes a first surface, wherein the output member includes a second surface, wherein the first surface and the second surface engage one another during the steering state, and wherein the first surface and the second surface are out of engagement during the dwell state.

42. The control mechanism of claim 41, wherein the input member rotates and wherein the output member rotates when the control mechanism is in the rear steering state.

43. The control mechanism of claim 37, wherein the input member includes first surface and a second surface, wherein the output member includes a third surface and a fourth surface, wherein the first surface engages the third surface in the rear steering state to move the output member in a first direction, wherein the second surface engages the fourth surface during the rear steering state to move the output member in a second direction, and wherein the first and second surfaces are out of engagement with the third and fourth surfaces, respectively, during the dwell state.

44. The control mechanism of claim 43, wherein the input member rotates about an axis and wherein the first and second surfaces are angularly spaced about the axis to form a dead band angle about the axis in which the input member may rotate while in the dwell state.

45. The control mechanism of claim 44, wherein the dead band angle is approximately 285 degrees.

46. The control mechanism of claim 45, wherein the rear motive members are biased towards a predetermined position while the control mechanism is in the dwell state.

47. The control mechanism of claim 46, wherein the rear motive members are biased towards a straight position while the control mechanism is in the dwell state.

48. The control mechanism of claim 37, including a housing assembly at least partially about the input member, the output member, the nut and the at least one spring, wherein the housing provides the at least one stationary surface.

49. The control mechanism of claim 37 including:
a nut threadably coupled to the output member and guided to move along an axis of the output member in conjunction with rotation of the output member;
a carriage having a first drive face facing a first side of the nut and a second drive face fixed to the first drive face while facing a second side of the nut, wherein the carriage moves along the axis;
a first stationary surface facing the first drive face;
a second stationary surface axially spaced from the first stationary surface and facing the second drive face;
a drive structure between the nut and the first drive face, wherein the structure is movable along the axis between the first drive face and the first stationary surface; and
a spring captured between the first drive face and the drive structure, wherein the spring biases the drive structure against the nut and the first stationary surface and wherein the spring biases the second drive face against the nut and the second stationary surface to bias the nut and the output member to a centering position and to resiliently bias the output member against rotation, wherein the positioning of the output member in the centering position results in the rear motive members being positioned in a straight position.

50. The control mechanism of claim 49 including a housing rotatably supporting the input member and the output member while providing the first stationary surface and the second stationary surface, wherein the housing guides movement of the first drive face and the second drive face along the axis and wherein the housing further guides movement of thread along the axis.

51. The control mechanism of claim 50, wherein the housing provides a sealed enclosure about a carriage, a nut, the spring and a junction area between the input member and the output member, wherein the sealed enclosure is at least partially filled with a lubricating fluid.

52. A method for controlling a front steering subsystem to steer front motive members and a rear steering subsystem to steer rear motive members on a vehicle, the method comprising:

applying a first force to a steering input device to move a portion of the device;
transmitting a second force based on the first force to an input shaft of the front steering subsystem, whereby the front steering subsystem adjusts steering of the front motive members based on movement of the input shaft; and
transmitting a third force based on the first force to an input member so as to move the input member through a first distance during which the input member moves relative to an output member coupled to an input shaft of the rear steering subsystem and through a second distance during which the third force is transmitted from the input member to the output member to move the output member and the input shaft of the rear steering subsystem, whereby the rear steering subsystem adjusts steering of the rear motive members based upon movement of the output member, wherein at least one of the second force and the third force is greater than the first force.

53. The method of claim 52, wherein the input member engages the output member as the input member moves through the second distance.

54. A vehicle steering system comprising:
front vehicle motive members;
rear vehicle motive members;
a steering input device;
a front steering subsystem operably coupled to the steering input device and coupled to the front motive members to steer the front motive members;
a rear steering subsystem coupled to the rear motive members to steer the rear motive members; and
a rear steering control mechanism including:
a movable input member coupled to the steering input device so as to move in response to input from the device;
a movable output member coupled to the rear steering subsystem, wherein the rear steering subsystem adjusts steering of the rear motive members in response to movement of the output member, wherein the control mechanism operates in a rear steering state in which force is transmitted from the input member to the output member to move the output member and a dwell state in which the output member does not move in response to movement of the input member, wherein the front steering subsystem includes an output shaft that moves in response to input from the device and wherein the output shaft is coupled to the input member so as to transmit force to the input member, wherein the front steering subsystem includes a first front powered steering gear having an input shaft coupled to the input device, and a second front powered steering near coupled between the output shaft and to the first front powered steering gear, wherein the first front powered steering gear is coupled to the front motive members, wherein the first front powered steering gear is coupled to the output shaft and wherein the second front powered steering gear drives the output shaft.

55. The system of claim 54 including a ratio device coupled between the output shaft and the input member to proportionally move the input member in response to movement of the output shaft.

56. The system of claim 54, wherein the second front powered steering gear is coupled to the front motive members to assist in steering the front motive members.

57. A vehicle steering system comprising:
front vehicle motive members;
rear vehicle motive members;
a steering input device;
a front steering subsystem operably coupled to the steering input device and coupled to the front motive members to steer the front motive members;
a rear steering subsystem coupled to the rear motive members to steer the rear motive members; and
a rear steering control mechanism including:
a movable input member coupled to the steering input device so as to move in response to input from the device; and
a movable output member coupled to the rear steering subsystem, wherein the rear steering subsystem adjusts steering of the rear motive members in response to movement of the output member, wherein the control mechanism operates in a rear steering state in which force is transmitted from the input member to the output member to move the output member and a dwell state in which the output member does not move in response to movement of the input member, wherein the output member is biased towards a centering position and wherein the rear steering subsystem steers the rear motive members to a straight position in response to the output member being in the centering position and, wherein the control mechanism includes a spring coupled to the output member to bias the output member to the centering position.

58. A vehicle steering system comprising:
front vehicle motive members;
rear vehicle motive members;
a steering input device;
a front steering subsystem operably coupled to the steering input device and coupled to the front motive members to steer the front motive members;
a rear steering subsystem coupled to the rear motive members to steer the rear motive members; and
a rear steering control mechanism including:
a movable input member coupled to the steering input device so as to move in response to input from the device;
a movable output member coupled to the rear steering subsystem, wherein the rear steering subsystem adjusts steering of the rear motive members in response to movement of the output member, wherein the control mechanism operates in a rear steering state in which force is transmitted from the input member to the output member to move the output member and a dwell state in which the output member does not move in response to movement of the input member;
a nut threadably coupled to the output shaft and guided to move along an axis of the output shaft in conjunction with rotation of the output shaft;
a carriage having a first drive face facing a first side of the nut and a second drive face fixed to the first drive face while facing a second side of the nut, wherein the carriage moves along the axis;
a first stationary surface facing the first drive face;
a second stationary surface axially spaced from the first stationary surface and facing the second drive face;
a drive structure between the nut and the first drive face, wherein the structure is movable along the axis between the first drive face and the first stationary surface; and
a spring captured between the first drive face and the drive structure, wherein the spring biases the drive member against the nut and the first stationary surface and wherein the spring biases the second drive face against the nut and the second stationary surface to bias the nut and the output member to a center position and to resiliently bias the output member against rotation, wherein the positioning of the output in the centering position results in the rear motive members being positioned in a straight position.

59. The system of claim 58 including a housing rotatably supporting the input member and the output member while providing the first stationary surface and the second stationary surface, wherein the housing guides movement of the first drive face and the second drive face along the axis and wherein the housing further guides movement of the nut along the axis.

60. The system of claim 59, wherein the housing provides a sealed enclosure about a carriage, a nut, the spring and a junction area between the input member and the output member, wherein the sealed enclosure is at least partially filled with a lubricating fluid.

61. A vehicle steering control mechanism for use with a vehicle having a steering input device, a front steering subsystem operably coupled to the device and coupled to front motive members to steer the front motive members, a rear steering subsystem coupled to rear motive members to steer the rear motive members, the control mechanism comprising:
a movable input member configured to be coupled to the steering input device so as to move in response to input from the device;
a movable output member configured to be coupled to the rear steering subsystem, wherein the rear steering subsystem adjusts steering of the rear motive members in response to movement of the output member, wherein the control mechanism operates in a rear steering state in which force is transmitted from the input member to the output member to move the output member and a dwell state in which the output member does not move in response to movement of the input member;
a nut threadably coupled to the output member and guided to move along an axis of the output member in conjunction with rotation of the output member;
a carriage having a first drive face facing a first side of the nut and a second drive face fixed to the first drive face while facing a second side of the nut, wherein the carriage moves along the axis;
a first stationary surface facing the first drive face;
a second stationary surface axially spaced from the first stationary surface and facing the second drive face;
a drive structure between the nut and the first drive face, wherein the structure is movable along the axis between the first drive face and the first stationary surface; and
a spring captured between the first drive face and the drive structure, wherein the spring biases the drive structure against the nut and the first stationary surface and wherein the spring biases the second drive face against the nut and the second stationary surface to bias the nut and the output member to a centering position and to resiliently bias the output member against rotation, wherein the positioning of the output member in the centering position results in the rear motive members being positioned in a straight position.

62. The control mechanism of claim 61 including a housing rotatably supporting the input member and the output member while providing the first stationary surface and the second stationary surface, wherein the housing guides movement of the first drive face and the second drive face along the axis and wherein the housing further guides movement of thread along the axis.

63. The control mechanism of claim 62, wherein the housing provides a sealed enclosure about a carriage, a nut, the spring and a junction area between the input member and the output member, wherein the sealed enclosure is at least partially filled with a lubricating fluid.

* * * * *